(12) United States Patent
Smith

(10) Patent No.: US 7,893,307 B2
(45) Date of Patent: Feb. 22, 2011

(54) APPARATUS AND PROCESS FOR CONVERTING FEED MATERIAL INTO REUSABLE HYDROCARBONS

(76) Inventor: David G. Smith, 9591 N. Bay Dr., Baileys Harbor, WI (US) 54202

( * ) Notice: Subject to any disclaimer, the term of this patent is extended or adjusted under 35 U.S.C. 154(b) by 400 days.

(21) Appl. No.: 12/035,947

(22) Filed: Feb. 22, 2008

(65) Prior Publication Data

US 2008/0202983 A1 Aug. 28, 2008

Related U.S. Application Data

(60) Provisional application No. 60/891,414, filed on Feb. 23, 2007.

(51) Int. Cl.
*C07C 1/00* (2006.01)
*B28C 1/16* (2006.01)

(52) U.S. Cl. ............... 585/241; 202/118; 202/208; 202/247; 201/2.5; 201/33; 422/224; 422/229; 366/75; 366/85; 366/99

(58) Field of Classification Search ............ 202/118, 202/208, 247; 201/2.5, 33; 422/224, 229, 422/204; 585/241; 366/75, 85, 99
See application file for complete search history.

(56) References Cited

U.S. PATENT DOCUMENTS

| | | | |
|---|---|---|---|
| 3,901,951 A | 8/1975 | Nishizaki |
| 4,014,780 A | 3/1977 | McCoy |
| 4,235,676 A | 11/1980 | Chambers |
| 4,298,355 A | 11/1981 | Staudinger |
| 4,302,353 A | 11/1981 | Escher et al. |
| 4,401,513 A | 8/1983 | Brewer |
| 4,412,889 A | 11/1983 | Oeck |
| 4,552,649 A | 11/1985 | Patterson et al. |
| 4,613,713 A | 9/1986 | Staffin et al. |
| 4,618,735 A | 10/1986 | Bridle et al. |

(Continued)

FOREIGN PATENT DOCUMENTS

EP 1 090 951 4/2001

(Continued)

OTHER PUBLICATIONS http://en.wikipedia.org/wiki/Gasification; Gasification, pp. 1-3.

(Continued)

*Primary Examiner*—N. Bhat
(74) *Attorney, Agent, or Firm*—Thomas W. Adams; Renner, Otto, Boisselle & Sklar, LLP

(57) ABSTRACT

Apparatus and process for producing hydrocarbon materials from a feed composition, the apparatus including a feed port; a viscous shear apparatus; a thermal decomposition assembly including a ribbonchannel reactor which includes an inner heated hollow cylinder; an outer heated hollow cylinder, one of which is rotatable with respect to the other, both heated hollow cylinders providing heat to the feed composition to convert it to a vapor fraction and a solid residue fraction; low height flighting mounted with respect to the inner and outer heated hollow cylinders to move the feed composition through the thermal decomposition assembly; at least one vapor port for removing the vapor fraction; and at least one solids port for removing the solid fraction.

26 Claims, 5 Drawing Sheets

U.S. PATENT DOCUMENTS

| | | | |
|---|---|---|---|
| 4,642,401 A | 2/1987 | Coenen et al. | |
| 4,678,860 A | 7/1987 | Kuester | |
| 4,686,008 A * | 8/1987 | Gibson | 202/118 |
| 4,712,992 A * | 12/1987 | Kim | 425/207 |
| 4,752,135 A * | 6/1988 | Loomans | 366/85 |
| 4,759,300 A * | 7/1988 | Hansen et al. | 110/229 |
| 4,774,895 A | 10/1988 | Christmann | |
| 4,826,323 A * | 5/1989 | Loomans et al. | 366/85 |
| 4,909,898 A * | 3/1990 | Padliya et al. | 159/47.1 |
| 4,919,686 A | 4/1990 | Edwards | |
| 4,934,286 A | 6/1990 | Fowler | |
| 4,990,237 A | 2/1991 | Heuer et al. | |
| 5,017,269 A * | 5/1991 | Loomans et al. | 201/25 |
| 5,151,159 A * | 9/1992 | Wolfe et al. | 202/118 |
| 5,158,983 A | 10/1992 | Stapp | |
| 5,198,018 A | 3/1993 | Agarwal | |
| 5,269,906 A | 12/1993 | Reynolds et al. | |
| 5,525,281 A * | 6/1996 | Lorcks et al. | 264/101 |
| 5,608,136 A | 3/1997 | Maezawa et al. | |
| 5,636,580 A | 6/1997 | Kanis | |
| 5,686,055 A | 11/1997 | Takahashi et al. | |
| 5,731,483 A | 3/1998 | Stabel et al. | |
| 5,744,668 A | 4/1998 | Zhou et al. | |
| 5,753,086 A | 5/1998 | Guffey et al. | |
| 5,756,871 A | 5/1998 | Wang | |
| 5,811,606 A | 9/1998 | Yang | |
| 5,821,396 A | 10/1998 | Bouziane | |
| 5,824,193 A | 10/1998 | Edwards | |
| 5,856,599 A | 1/1999 | Kuroki | |
| 5,865,956 A | 2/1999 | Bridle et al. | |
| 5,895,827 A | 4/1999 | Takahashi et al. | |
| 5,969,201 A | 10/1999 | Kalnes et al. | |
| 5,973,217 A | 10/1999 | Hastrich et al. | |
| 6,005,149 A | 12/1999 | Bishop | |
| 6,011,187 A | 1/2000 | Horizoe et al. | |
| 6,060,631 A | 5/2000 | James, Jr. et al. | |
| 6,106,733 A | 8/2000 | Wood | |
| 6,133,491 A | 10/2000 | Xing | |
| 6,150,577 A | 11/2000 | Miller et al. | |
| 6,172,271 B1 | 1/2001 | Horizoe et al. | |
| 6,172,275 B1 | 1/2001 | Tadauchi et al. | |
| 6,184,427 B1 | 2/2001 | Klepfer et al. | |
| 6,251,148 B1 | 6/2001 | Redepenning et al. | |
| 6,258,988 B1 | 7/2001 | Nagel et al. | |
| 6,270,630 B1 | 8/2001 | Xing | |
| 6,271,427 B1 | 8/2001 | Ershag | |
| 6,534,689 B1 | 3/2003 | Stankevitch | |
| 6,866,830 B2 | 3/2005 | Kwak | |
| 7,144,558 B2 * | 12/2006 | Smith et al. | 422/224 |
| 7,438,785 B2 * | 10/2008 | Meier et al. | 201/21 |
| 2003/0127310 A1 | 7/2003 | Lemmons et al. | |
| 2003/0127312 A1 | 7/2003 | Lemmons et al. | |
| 2003/0130548 A1 | 7/2003 | Lemmons et al. | |
| 2003/0199718 A1 | 10/2003 | Miller | |
| 2006/0143977 A1 * | 7/2006 | Meijer et al. | 44/629 |
| 2006/0280669 A1 * | 12/2006 | Jones | 423/445 R |
| 2006/0289287 A1 * | 12/2006 | Maskarinec et al. | 202/118 |
| 2007/0209923 A1 * | 9/2007 | Flottvik | 202/118 |

FOREIGN PATENT DOCUMENTS

| | | |
|---|---|---|
| GB | 2 158 089 | 11/1985 |
| WO | 00/64997 | 11/2000 |
| WO | 01/05908 | 1/2001 |
| WO | 2004/072208 | 8/2004 |
| WO | 2005/087897 | 9/2005 |

OTHER PUBLICATIONS

L.J. Rigby; Standard Telecommunication Laboratories Ltd, Harlow, Essex; "The Collection and Identification of Toxic Volatiles from Plastics Under Thermal Stress"; Ann. Occup. Hyg. vol. 24, No. 4, pp. 331-345, 1981.

Krzysztof Pielichowski and James Njuguna; Rapra Technology Limited; "Thermal Degradation of Polymeric Materials"; 2005.

* cited by examiner

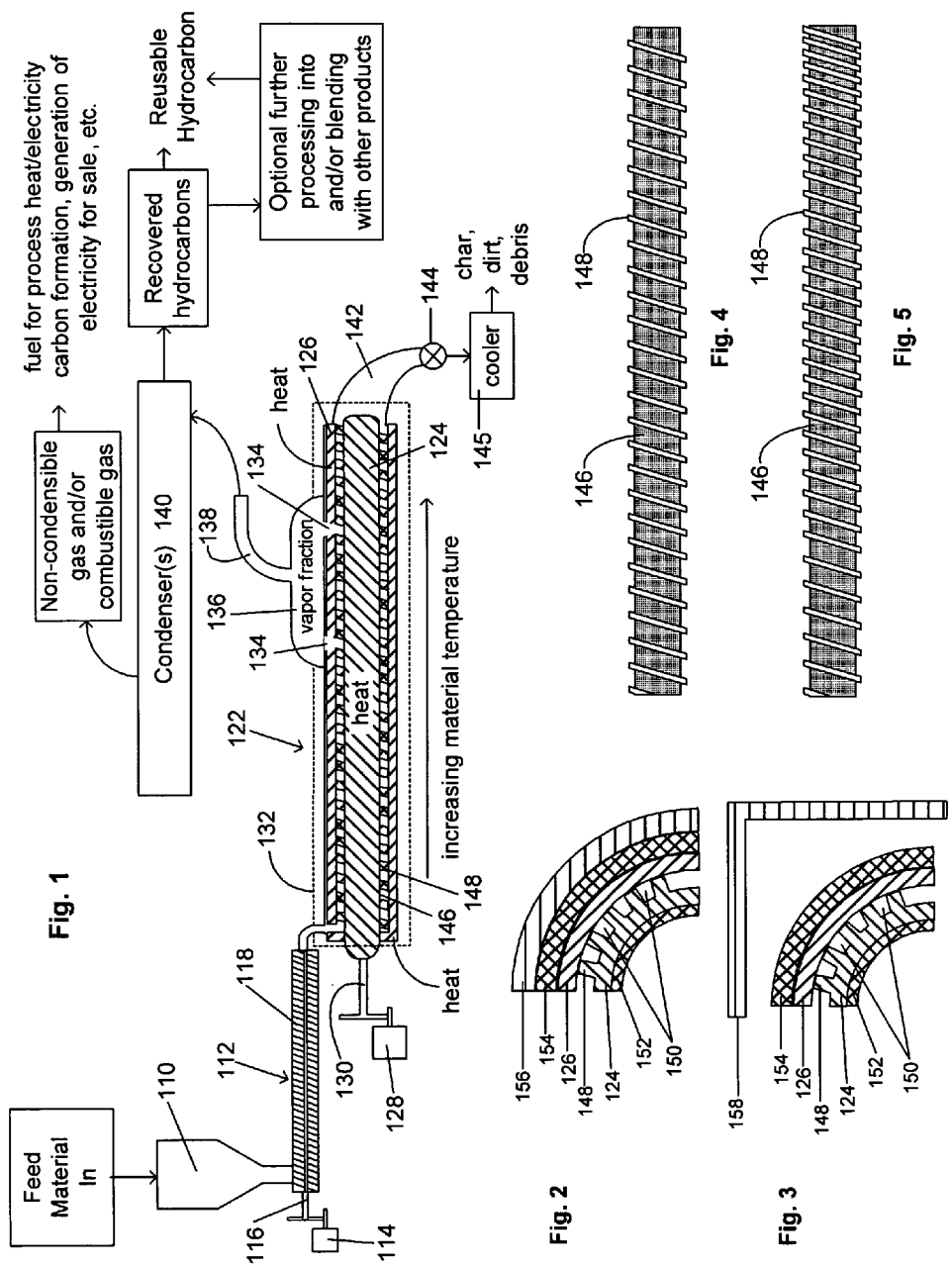

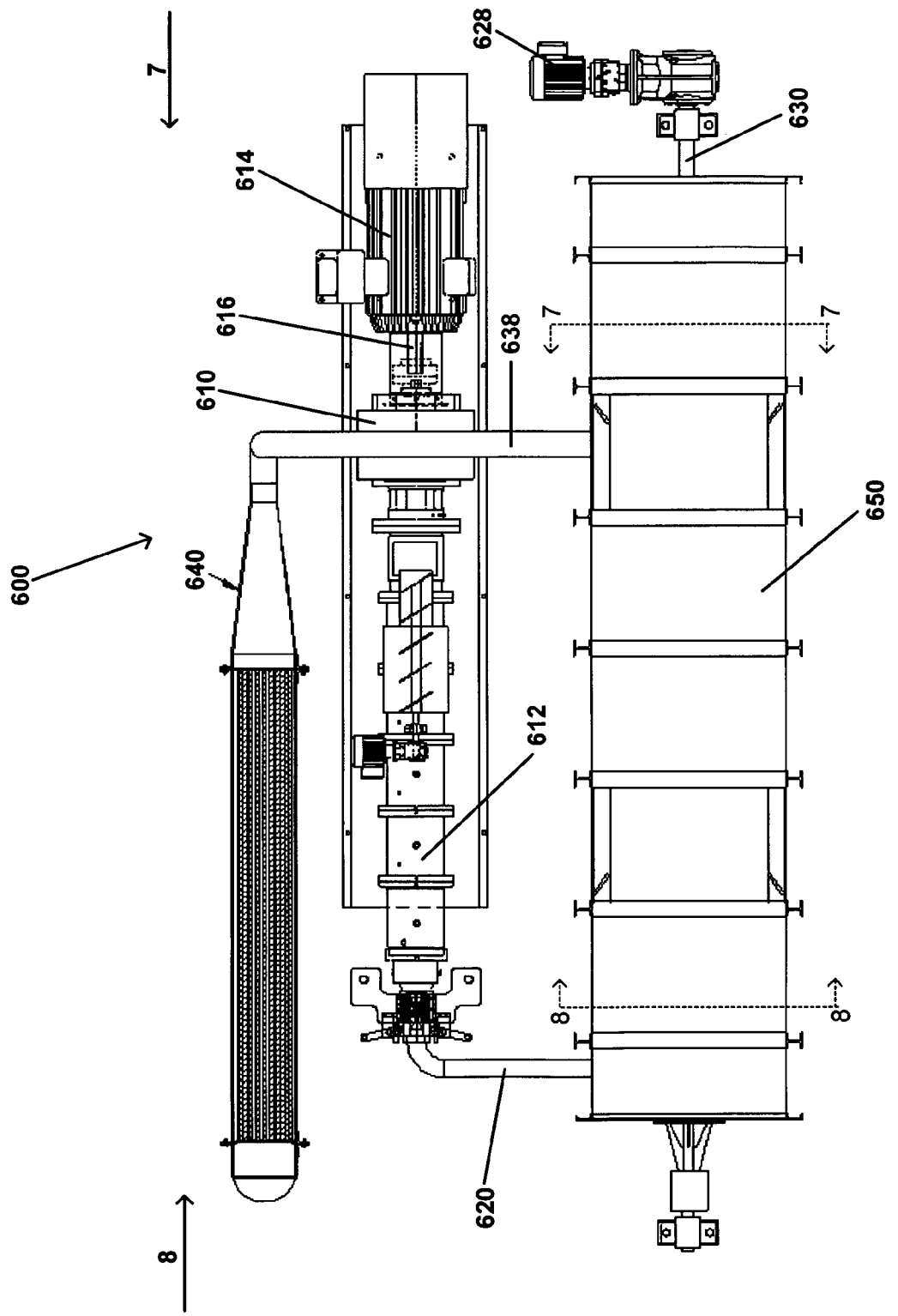

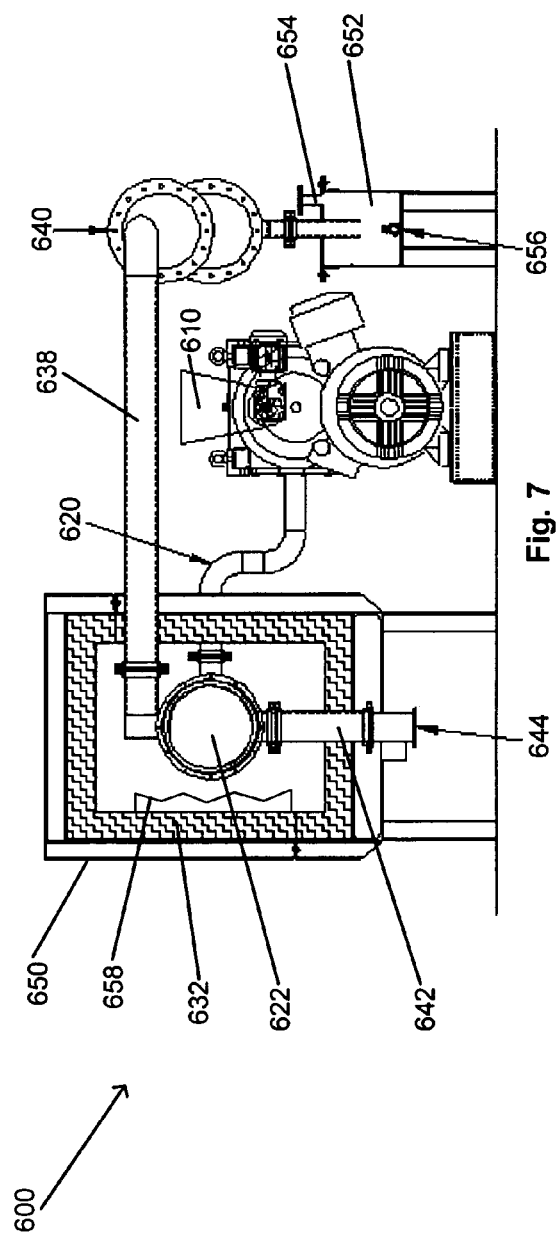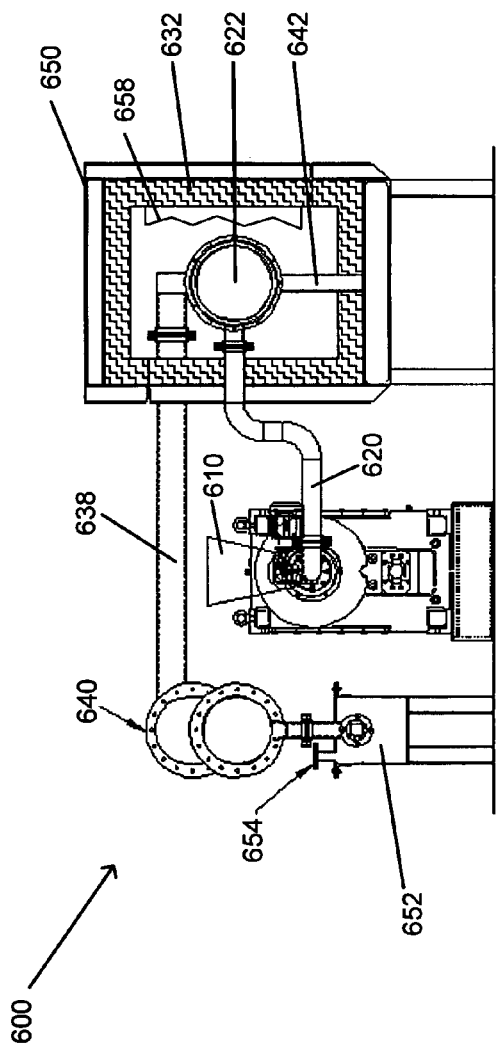
Fig. 7
Fig. 8

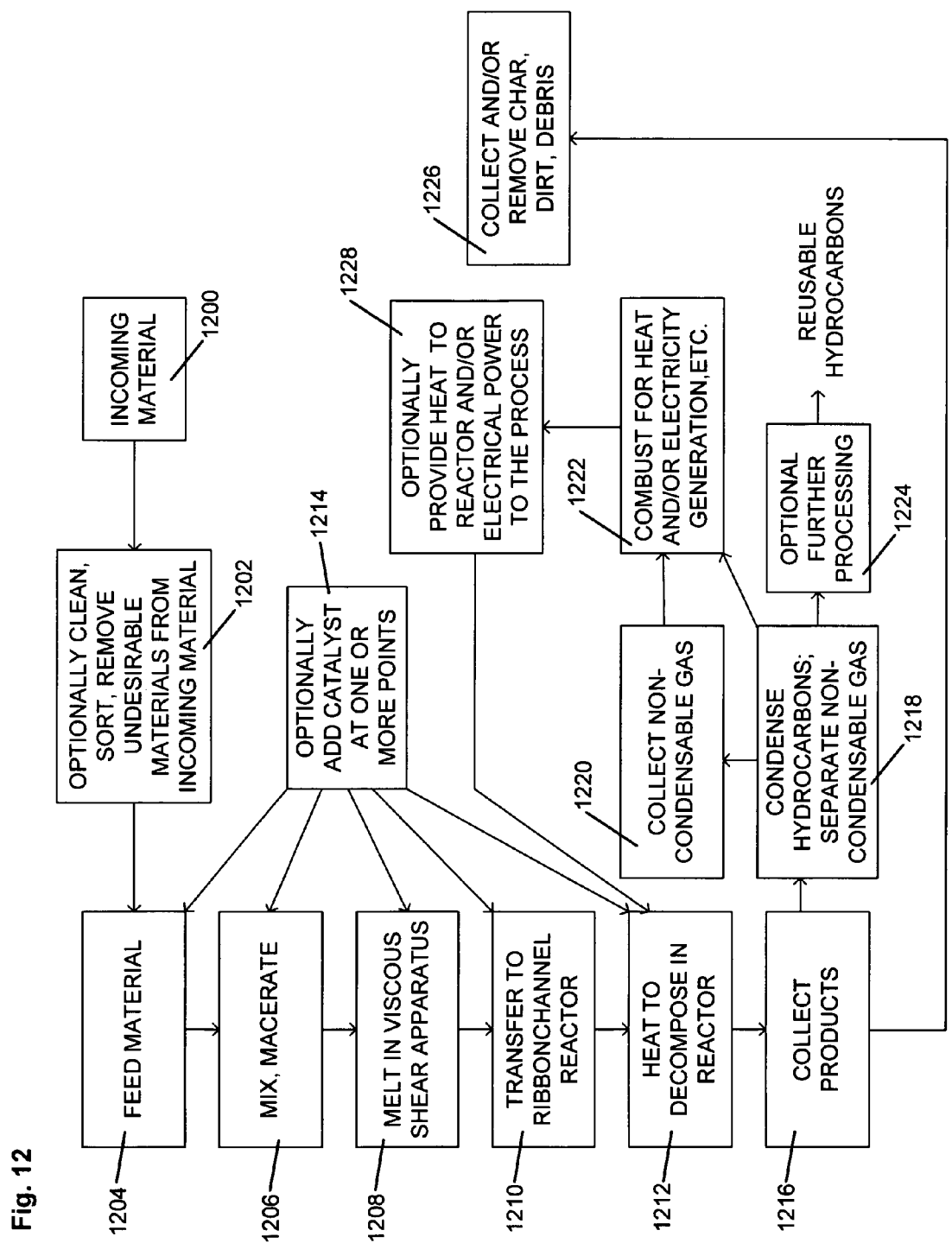

US 7,893,307 B2

APPARATUS AND PROCESS FOR CONVERTING FEED MATERIAL INTO REUSABLE HYDROCARBONS

CROSS-REFERENCE TO RELATED APPLICATION

The present application is related to and claims benefit under 35 U.S.C. §119(e) to co-pending U.S. Provisional Application No. 60/891,414, filed 23 Feb. 2007, entitled "APPARATUS AND METHOD FOR CONVERTING HYDROCARBON-FORMABLE MATERIALS INTO FUEL", the entirety of which is hereby incorporated herein by reference.

FIELD OF INVENTION

The present invention relates to an apparatus and to a process for converting hydrocarbon-formable materials, such as plastics and other waste or other recycled materials, into fuel, and more particularly to a highly efficient, relatively simple process for pyrolyzing various materials capable of thermal degradation into hydrocarbons, recovering therefrom valuable hydrocarbons useable as fuels, lubricants and other end uses, which can be carried out in the apparatus.

BACKGROUND

As is well known, the quantity of waste and/or recycled materials, and in particular, plastics, rubber and other material having a relatively high molecular weight and a significant content of hydrocarbon-forming materials, have been increasing continuously for many years, disposal of waste plastics in landfills and similar repositories is highly unsatisfactory for a number of reasons, and methods of recycling waste plastics and other such materials have consistently met with and failed to overcome the serious economic, practical and technical difficulties inherent therein. There is no end in sight to the increase in quantity of such materials used by humans. Landfill disposal has long been recognized as problematic and quite unsatisfactory for reasons including the extensive time required for most polymers to degrade, the loss of resources represented by the millions of tons of polymeric materials which are discarded every year, and the danger inherent in the eventual decomposition of these materials. A great variety of methods of recycling plastics have been developed and most have been discarded as economically non-viable. The reasons for this include the difficulty in identifying, sorting and separating the many different types of plastics, blending in other materials, the difficulty in developing functional continuous processes and equipment for recycle of those relatively few types of plastics that actually lend themselves to reuse, the difficulty in developing systems for the pyrolytic (or other) degradation of the many different types of plastics into hydrocarbon products, and the difficulty in dealing with the remaining byproducts from such pyrolytic processes.

One reason prior art processes have failed to be economically viable, particularly in regard to the amount of hydrocarbon materials recovered relative to the cost of operating the process, is that plastic materials have a very low thermal conductivity. The low thermal conductivity can lead to low through-put relative to the size of equipment and quantity of energy expended in attempting to convert the feed materials into hydrocarbons. Due to inefficient use of the applied heat, the prior art has employed large and complicated conventional heat transfer apparatus, especially in the initial heating stages. For example, the peripherally heated stirred pot concept is of limited utility and quite low efficiency due to the poor heat transfer through the large mass of material sought to be heated. In prior art processes, these factors have resulted both in an unacceptably low return on investment due to inefficient operation resulting from the poor heat transfer and in the formation of relatively large quantities of carbonaceous char and low value non-condensable byproducts, further reducing the quantity of valuable, useable hydrocarbon products obtained from these processes.

For at least these reasons, an unmet need remains for a fast, efficient, relatively small and simple system and process for receiving, pyrolyzing and recovering useful hydrocarbon products from waste plastics in an economically efficient manner, relatively free of technical difficulties arising from the very nature of the raw materials fed into the system and process.

SUMMARY

The present invention addresses and provides a solution to the difficulties which the prior art has failed to address and overcome, and as a result provides a system and process for recycling and converting materials such as waste plastics into useable fuels economically and efficiently. The process may further allow for recovery of non-condensable but combustible gases containing a sufficient quantity of heat-producing capability to heat or provide all needed energy for operation of the process.

An important aspect of the present invention is a ribbonchannel reactor. The feed composition sought to be converted to hydrocarbon product is fed into the ribbonchannel and formed into a relatively thin ribbon. Heat is applied to the ribbon from major two sides or faces of the ribbon and the feed composition is quickly and efficiently decomposed thermally to form the sought hydrocarbon products. The relatively thin ribbon of feed composition is heated from both major sides to bring substantially the entire thickness of the ribbon of material to temperatures at which it is converted to the desired hydrocarbon product, thus overcoming the limitations imposed by the poor thermal conductivity of the feed composition. The ribbonchannel is defined by the heated surfaces and the low flighting. When these aspects of the invention are combined and operated as described herein, a solution is provided to the prior art problems described above which have plagued the recycling industry for many years and previously have not been satisfactorily addressed.

Thus, the present invention in one embodiment includes a process for converting a feed composition to a hydrocarbon material in a ribbonchannel reactor. The feed composition includes one or more materials decomposable into the hydrocarbon material. The reactor includes a first heated cylindrical surface and a second heated cylindrical surface spaced away from the first heated cylindrical surface. The first and second heated cylindrical surfaces provide heat to the major faces of the thin ribbon. The process includes flowing the feed composition in the reactor; rotating the first heated surface relative to the second heated surface; forming a substantially spiral ribbon including the feed composition; and heating the substantially spiral ribbon to generate therefrom a vapor including the hydrocarbon material.

The present invention, in another embodiment, includes a process for converting a feed composition to a hydrocarbon material in a thermal decomposition assembly including the ribbonchannel reactor as described herein. In this embodiment, the ribbonchannel reactor includes a first heated cylindrical surface, a second heated cylindrical surface spaced away from and mounted substantially concentrically to the first heated cylindrical surface, and a plurality of low flighting mounted on the first heated surface. The first heated surface, the second heated surface and the low flighting define a substantially spiral ribbonchannel. A plurality of ribbonchannels extend substantially the full length of the ribbonchannel reactor, arranged in a spiral or helically on the surface of the cylindrical surface. The process in this embodiment includes flowing the feed composition in the ribbonchannel to form therein a substantially spiral ribbon including the feed material. The feed composition includes one or more materials decomposable into the hydrocarbon material. The process in this embodiment further includes rotating the first heated surface relative to the second heated surface; heating and decomposing the substantially spiral ribbon to form the hydrocarbon material; and generating a vapor including the hydrocarbon material. The process may further include removing from the apparatus and condensing at least a portion of the vapor.

In one embodiment, process further includes softening the feed composition in a viscous shear apparatus prior to the flowing into the ribbonchannel reactor.

In one embodiment, the low height flighting includes a plurality of spirally oriented flights extending outwardly from the first heated cylindrical surface. These surfaces and the second heated cylindrical surface define the ribbonchannel and form a ribbon of the feed composition which enables the ribbonchannel reactor to efficiently transfer heat from two sides to the two major faces of the ribbon of feed composition. This results in a very efficient, smooth and rapid decomposition of the feed composition into a high proportionate quantity of hydrocarbon materials, some quantity non-condensable gas and char.

In one embodiment, the process further includes adding a catalyst to the feed composition at one or more of the flowing, forming, rotating and heating. In one embodiment, the catalyst includes fly ash. Other catalysts may be used, as described below, and the fly ash may be treated prior to being introduced into the process.

The present invention, in another embodiment, includes a process for producing hydrocarbon materials from a feed composition in a thermal decomposition apparatus which includes a viscous shear apparatus and a ribbonchannel reactor. In one embodiment, the process includes providing a feed composition; softening the feed composition in the viscous shear apparatus to form a softened feed composition; and transferring the softened feed composition into a proximal portion of the ribbonchannel reactor. In one embodiment, substantially all of the softening in the viscous shear apparatus results from heat generated by mechanical shear and substantially no decomposition of the feed composition occurs during the softening As noted, the thermal decomposition assembly of the present invention includes the ribbonchannel reactor, which is a heat transfer device for imparting sufficient heat to the softened feed composition to cause it to form the desired hydrocarbon material. In one embodiment the ribbonchannel reactor includes an inner heated hollow cylinder, an outer heated hollow cylinder, and low height flighting disposed on the outer surface of the inner hollow cylinder. The inner heated hollow cylinder is substantially concentric with and is rotatable with respect to the outer heated hollow cylinder, and the low height flighting progressively moves the feed composition through the ribbonchannel reactor. Both heated hollow cylinders provide heat for increasing temperature of the feed composition thereby to convert the feed composition into (a) a vapor fraction and (b) a solid residue fraction. The ribbonchannel reactor further includes at least one vapor port for removing the vapor fraction and at least one solids port at a distal portion of the thermal decomposition assembly for removing the solid fraction. The process further includes decomposing at least a portion of the feed composition in the ribbonchannel reactor to form the vapor fraction and the solid residue fraction, removing the vapor fraction from the ribbonchannel reactor through the at least one vapor port; and removing the solid residue fraction from the ribbonchannel reactor through the at least one solids port.

In one embodiment, the present invention relates to a thermal decomposition apparatus for producing hydrocarbon materials from a feed composition. The apparatus includes a feed port; a viscous shear apparatus adapted for softening but not decomposing or volatilizing the feed composition fed from the feed port; a ribbonchannel reactor which in turn includes (a) an inner internally heated hollow cylinder; and (b) an outer externally heated hollow cylinder, in which the inner heated hollow cylinder is substantially concentric and rotatable with respect to the outer heated hollow cylinder, and in which both heated hollow cylinders provide heat for increasing temperature of the feed composition to convert the feed composition into (i) a vapor fraction and (ii) a solid residue fraction; (c) low height flighting mounted with respect to the inner heated hollow cylinder and the outer heated hollow cylinder to progressively move the feed composition towards the distal portion of the thermal decomposition assembly; (d) at least one vapor port for removing the vapor fraction; and (e) at least one solids port at the distal portion of the ribbonchannel reactor for removing the solid fraction. In the viscous shear apparatus, in one embodiment, substantially all of the softening results from heat generated by mechanical shear, and no externally applied heat source is included in this portion of the thermal decomposition apparatus.

The ribbonchannel reactor of this invention is a unique device. By virtue of the substantially concentric mounting of two closely sized hollow cylinders and the plurality of continuous low height helical flighting disposed between the two cylinders, a ribbonchannel is defined in which a relatively thin ribbon of the feed composition is formed. The low flighting extends across almost the full distance separating the two cylinders (within tolerances needed to allow free rotation of one cylinder with respect to the other). Both cylinders are heated, so that the ribbon is subjected to heat from both sides. This unique combination simultaneously transports the input feed composition while very rapidly providing to it the heat for decomposition of the feed composition to form hydrocarbon materials.

The present invention provides a solution to the problems resulting from the low thermal conductivity of polymeric and other feed composition materials by use of the ribbonchannel reactor, which provides a high ratio of heated surface to quantity of heated feed composition.

These features enable a rapid transfer of heat from the surface of the heated hollow cylinders to the feed composition carried between the heated hollow cylinders, so that the feed composition is relatively uniformly heated to a decomposition temperature at which the feed composition is degraded primarily into useful hydrocarbons, while minimizing the formation of char on the one hand and small, non-condensable hydrocarbons on the other hand. The details provided in the following disclosure enable those skilled in the art to understand the invention, to make and use the apparatus and to carry out the process disclosed herein. While some trial and error may be needed to optimize the conditions for a given blend of waste feed composition to be fed to the apparatus and process, the details set forth in the following adequately disclose the invention and the best mode of carrying out the invention, as currently known.

BRIEF DESCRIPTION OF THE DRAWINGS

FIG. 1 is a schematic depiction of a thermal decomposition apparatus and portions of a process in accordance with one embodiment of the present invention.

FIG. 2 is a schematic depiction of a partial cross-section of an embodiment of the low height flighting mounted with respect to the inner heated hollow cylinder and the outer heated hollow cylinder.

FIG. 3 is a schematic depiction of a partial cross-section of another embodiment of the low height flighting mounted with respect to the inner heated hollow cylinder and the outer heated hollow cylinder.

FIG. 4 is a schematic depiction of a side view of a low height flighting in accordance with an embodiment of the present invention.

FIG. 5 is a schematic depiction of a side view of a low height flighting in accordance with another embodiment of the present invention.

FIG. 6 is a diagrammatic top plan view of an embodiment of an apparatus for carrying out the method in accordance with the present invention.

FIG. 7 is a diagrammatic view of the apparatus of FIG. 6 taken from the direction indicated by the arrow 7 in FIG. 6.

FIG. 8 is a diagrammatic view of the apparatus of FIG. 6 taken from the direction indicated by the arrow 8 in FIG. 6.

FIG. 12 is a generalized flow diagram of illustrating several variations on processes in accordance with embodiments of the present invention.

Figure 11:
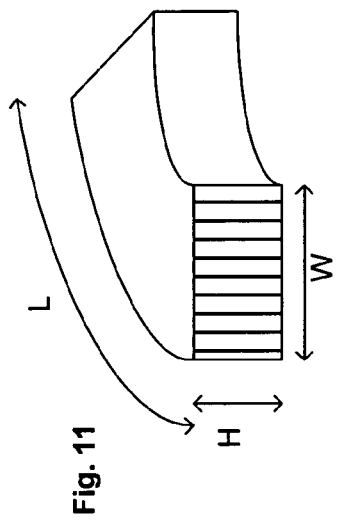
FIG. 11 is a schematic depiction of a ribbonchannel or, alternatively, of a ribbon of the feed composition, in accordance with an embodiment of the present invention.

It should be appreciated that for simplicity and clarity of illustration, elements shown in the Figures have not necessarily been drawn to scale. For example, the dimensions of some of the elements may be exaggerated relative to each other for clarity. Further, where considered appropriate, reference numerals have been repeated among the Figures to indicate corresponding elements.

Furthermore, it should be appreciated that the process steps and structures described below may not form a complete process flow for producing end-useable hydrocarbon materials from feed compositions such as waste polymeric materials. The present invention can be practiced in conjunction with feed compositions such as waste polymeric material and hydrocarbon product handling and processing techniques currently used in the art, and only so much of the commonly practiced process steps are included as are necessary for an understanding of the present invention.

DETAILED DESCRIPTION

Throughout the specification and claims, the range and ratio limits may be combined. It is to be understood that unless specifically stated otherwise, reference to "a", "an", and/or "the" may include one or more than one, and that reference to an item in the singular may also include the item in the plural. All combinations specified in the specification and claims may be combined in any manner, and any one or more individual element of a group of elements may be omitted from the group.

Certain of the embodiments of the invention briefly described in the foregoing Summary are described in more detail in the following written description and accompanying drawings, so as to enable a person of skill in the art to make and use the invention.

In one embodiment, the feed composition includes plastics (thermoplastics and/or thermosetting polymers), which may be new, recycled, waste or even virgin plastics. In one embodiment, the feed composition may include, in addition to plastics, natural or synthetic rubbers, which may be in the form of crumb, particles or powder, used lubricants such as motor oil, gear oil, etc., waste glycerin from, e.g., biodiesel operations, tire "fluff" (cotton-like wads of shredded polymer material, such as that used in tires as reinforcing cord, and other finely divided pieces obtained when used tires are chopped and/or shredded to separate the rubber from the reinforcement materials used in tires), automobile "fluff" (the mixed material remaining after the metals have been recovered from scrap autos), natural oils such as vegetable oils recovered from food preparation, etc., and in one embodiment, any organic-based material. Thus, in one embodiment, the term "feed composition" as used with respect to the material fed to the process of the present invention may include any of the foregoing materials, all of which can yield useful hydrocarbons from the process of the present invention.

As will be understood, the actual nature of the "feed composition" will change as it is processed, i.e., as it is thermally decomposed. However, for simplicity, the material being processed in the thermal decomposition assembly of the present invention is referred to herein as the feed composition, without regard to its actual state of decomposition in the process, except as otherwise specifically stated.

The term "ribbonchannel" may refer to a channel having an internal dimension of height H (or thickness) from about 0.25 inch (about 0.63 cm) up to about 1.5 inches (about 3.8 cm), in one embodiment, up to about 1 inch (about 2.5 cm), in one embodiment up to about 0.75 inch (about 1.9 cm), and in one embodiment, up to about 0.5 inch (about 1.25 cm). In one embodiment, the ribbonchannel has an internal dimension of width W that ranges from about 3 to about 10 times the internal dimension of height H. The ribbonchannel has an internal length L that is, in one embodiment, at least three orders of magnitude greater than the internal dimension of height, and in one embodiment, at least four orders of magnitude greater than the internal dimension of height. In most embodiments, the length L of the ribbonchannel is the length of the helical or spiral path from the proximal end to the distal end of the ribbonchannel reactor. As a result of the internal dimensions of this channel, a material contained in and at least partially filling the channel forms a relatively thin, relatively wide, elongated ribbon of the material. Here and elsewhere throughout the specification and claims, the numerical limits of ranges and ratios may be combined, and such ranges are deemed to include all intervening values and sub-ranges.

In one embodiment, the ribbonchannel is formed by a combination of (1) the inner surface of a first or outer heated hollow cylinder; (2) the outer surface of a second or inner heated hollow cylinder disposed inside the hollow of the first heated hollow cylinder; and (3) low height flighting spirally disposed between and separating the first heated hollow cylinder and the second heated hollow cylinder. In this embodiment the width of the ribbonchannel is defined by the space between adjacent pairs of the low height flighting, the height of the ribbonchannel is defined by the height of the low height flighting, and the length of the ribbonchannel is defined by the length of the first and second heated hollow cylinders. Thus, the term "low height flighting" refers to the flights substantially filling the relatively small distance between the respective cylinders and defining the side walls of the ribbonchannel.

An important aspect of the ribbonchannel of the present invention is its capability to provide two-sided heating to the ribbon of feed composition in the ribbonchannel. Two-sided heating provides at least twice the heating capability, in terms of rate and efficiency of heat transfer, as would be obtained from either single-side heating or heating applied to a greater thickness of the feed composition than the thicknesses disclosed herein for the ribbonchannel.

The term "ribbonchannel reactor" may refer to an apparatus including at least one process ribbonchannel, and in one embodiment a plurality of process ribbonchannels, in which a chemical conversion may occur. The ribbonchannel reactor may be used to decompose a feed composition, such as a polymer, into a hydrocarbon material product. The ribbonchannel reactor may include one or more headers or manifold assemblies for providing for the flow of reactants into the process ribbonchannels, and one or more footers or manifold assemblies providing for the flow of product and/or byproduct out of the process ribbonchannels. The ribbonchannel reactor may further include one or more heat sources. The heat sources may include separate heat sources applied to opposing surfaces defining the process ribbonchannel.

It is important to note that the ribbonchannel reactor is not an extruder. An extruder has a number of differences in both construction and operation, and would not be capable of efficiently, if at all, carrying out the function of the ribbonchannel reactor. In the apparatus of the present invention, the wall thicknesses of the heated cylinders range from about 0.188 in. to about 0.375 in., while the wall thickness of an extruder is generally at least one inch. The maximum temperature at which the ribbonchannel reactor can be operated is about 1400° F. (about 760° C.), while the maximum for any extruder is about 1000° F. (about 538° C.). The rotated heated cylinder in the ribbonchannel reactor of the present invention is rotated at about 5 to 15 rpm by a motor having from about 5 to about 20 horsepower (hp), while an extruder is rotated at greater than 15 rpm and requires a motor having at least 100 hp.

Unlike an extruder, the ribbonchannel reactor does not have a die at the terminal end; rather it has a solids removal port for removing whatever relatively small amount of char, dirt, metals, etc. that may remain when the thermal decomposition portion of the process is complete.

Unlike an extruder, the internal pressure of the ribbonchannel reactor is at about ambient pressure, possibly plus a few psi which may result from an air lock or seal used to prevent entry of atmospheric air into the apparatus, while extruders operate at internal pressures ranging from 50 psi to about 5,000 psi.

Unlike an extruder, the ribbonchannel reactor has low height flighting extending almost the full distance from cylinder to cylinder, leaving almost no clearance between the ends of the flights and the wall of the cylinder the flights pass by. The low flighting of the ribbonchannel reactor has a flight height ranging from about 0.25 in. to about 1.5 in., a flight thickness ranging from about 0.188 in. to about 0.25 in., and a flight pitch, in one embodiment, of about 4 to about 10 in., and in one embodiment, about 5 in. to about 8 in., and in another embodiment about 6 in., while the flighting in an extruder has a flight height ranging upwards of several inches, a flight thickness of at least 0.5 in., and a flight pitch of about 4.5 in. or less.

Unlike an extruder, the low flighting of the ribbonchannel reactor has a clearance of about 0.01 in. to about 0.025 in. from the surface past which it travels (when the flighting is mounted on the outer surface of the inner heated cylinder, the clearance is from the inner surface of the outer heated cylinder), while the clearance of the flights in an extruder from the outer wall ranges from about 0.04 to about 0.5 inch.

Thus, there are many distinctions between the ribbonchannel reactor of the present invention and a conventional extruder.

Figure 10:
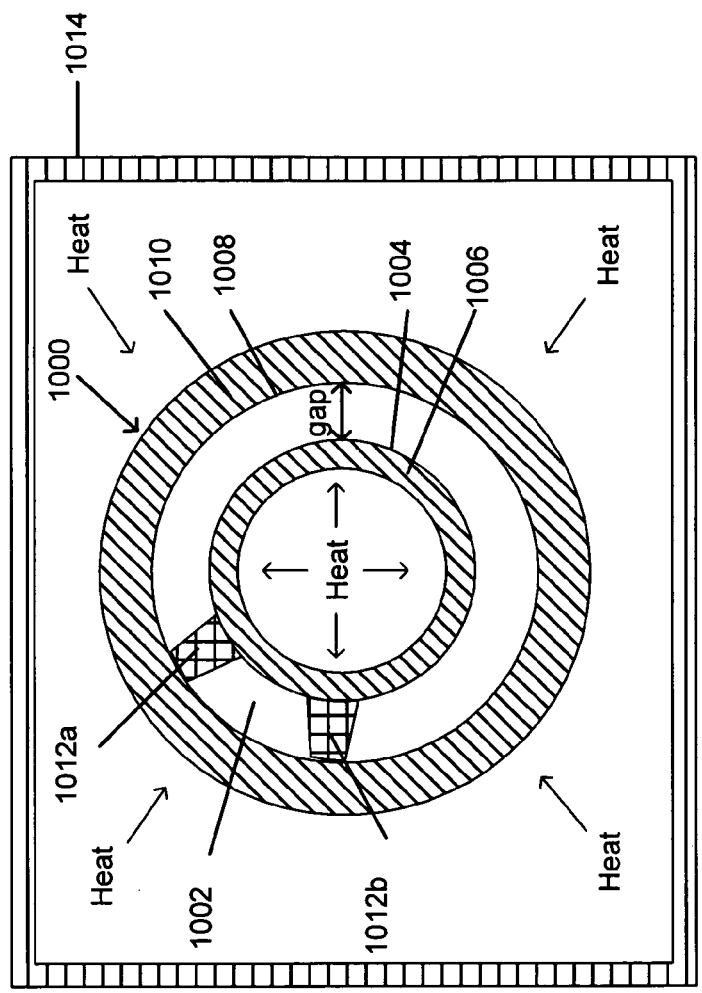
FIG. 10 is a schematic depiction of a cross-section of an embodiment of the ribbonchannel reactor of the present invention.

Referring now to FIG. 10, one embodiment of the present invention is schematically illustrated. It is emphasized here (as noted above regarding all of the drawings) that the relative sizes of the elements of this figure are not drawn to scale or in proportion to those of the invention, but that certain dimensions are exaggerated for clarity and ease of illustration. In the embodiment shown in FIG. 10, a ribbonchannel reactor 1000 includes a ribbonchannel 1002, which is defined by (a) the outer surface 1004 of the inner heated hollow cylinder 1006, (b) the inner surface 1008 of the outer heated hollow cylinder 1010, when the inner hollow heated cylinder 1006 is placed within the hollow center of the outer heated hollow cylinder 1010, and (c) a plurality of low height flighting 1012a, 1012b, spirally disposed on the outer surface 1004 of the inner heated cylinder 1006. The height H of the ribbonchannel 1002 is defined by the gap or space between the outer surface 1004 and the inner surface 1008 of the respective hollow cylinders, measured radially, and is substantially the same as the height of the low height flighting. The width W of the ribbonchannel is defined by the average distance between adjacent flights of the plurality of low flighting 1012a, 1012b, measuring perpendicular to the longitudinal direction of the flighting. As will be understood, the "average" distance between the adjacent ones of the low flighting 1012a, 1012b is used since the sidewalls of the flights may be slightly non-perpendicular, so the distance between them at the base may be different from the distance between at the top or outermost edge. The length L of the ribbonchannel is not shown in FIG. 10, but would extend into the plane of the page in this drawing.

As shown in FIG. 10, in accordance with the present invention, both the inner cylinder 1006 and the outer cylinder 1010 are heated, and they are separately heated, in that the inner cylinder 1006 is heated from within its hollow space, and the outer cylinder 1010 is heated by externally applied heat. As shown in FIG. 10, in one embodiment, the ribbonchannel reactor is contained within a chamber 1014. As described herein, the chamber 1014 may include a heat source such as electrical heating elements disposed on its inner walls.

As shown in FIG. 10, the inner cylinder 1006 is mounted substantially concentrically within the hollow space of the outer cylinder 1010. "Substantially concentric" (and conjugate terms) means that the two cylinders are concentric within manufacturing or engineering tolerances. Thus, in one embodiment of the present invention, the inner cylinder 1006 is not mounted in an eccentric position within the hollow space of the outer cylinder 1010.

In accordance with embodiments of the present invention, the feed composition in the ribbonchannel is carried around substantially the entire circumference of the inner and outer cylinders, and substantially does not pool or accumulate in the bottom.

FIG. 11 is a schematic depiction of a ribbonchannel, showing the height, H, the width, W, and the length, L, dimensions of the ribbonchannel. In accordance with an embodiment of the invention, when the ribbonchannel is substantially filled, a ribbon of material within the ribbonchannel will have approximately these same dimensions, at least initially. As noted above with respect to FIG. 10, in accordance with the present invention, the height, H of FIG. 11 is substantially equivalent to the height of the low height flighting, e.g., 1012a and 1012b, shown in FIG. 10. Suitable, exemplary ranges of the dimensions of H, W and L have been described above.

In accordance with the invention, both outer and the inner heated hollow cylinders are in the form of a tube or a pipe, as opposed to a solid cylinder, in which each hollow cylinder has walls and an inner longitudinal cavity. In such embodiment, heat is provided within the cavity.

In an alternative embodiment, still in accordance with the invention, the inner heated cylinder may be a solid cylinder, in which heating elements are embedded within the cylinder, for example, in the radially outer portions of the cylinder or in longitudinal cavities in the radially outward portions of the cylinder. Thus, the hollow space in the inner cylinder may be substantially filled with heat-providing articles.

The simplest and most expeditious configuration, for both the inner and outer heated hollow cylinders is a tube or pipe, in one embodiment a stainless steel or mild steel pipe, such as, for stainless, a schedule 10s pipe, or for mild steel, a schedule 10 or schedule 20 pipe. It is possible to use heavier pipe, e.g., schedule 40 (or 40s for stainless) or even schedule 80 pipe could be used, but it is not considered necessary, and if used these heavier pipes would bring a concomitant increase in weight and cost. As known in the pipe industry, schedule 10s stainless steel pipe, having an outside diameter ranging from 12 to 36 inches (30.5 cm To 91.5 cm) has a wall thickness ranging from about 0.18 to about 0.25 in. (about 0.45 cm to about 0.64 cm). Larger diameter pipe could be used to scale up the apparatus of the present invention, but might require custom-made pipe sizes.

FIG. 1 is a schematic depiction of a thermal decomposition assembly 100 and portions of a process in accordance with one embodiment of the present invention.

As illustrated in FIG. 1, a feed composition, such as polymeric materials, recycled mixed plastics, or other hydrocarbon-forming material as described herein, is fed to the assembly 100. In one embodiment, the feed composition is substantially free of chlorine-containing polymers such as PVC or CPVC. Chlorine-containing polymers can form hydrochloric acid during pyrolysis or decomposition which is undesirable for a number of reasons, especially for stress corrosion cracking of stainless steel, corrosion of mild steel, and due to the problems in handling HCl, for example. In one embodiment, the feed composition may be substantially free of polystyrene and/or substantially free of polyurethane. In one embodiment, the feed composition includes unsorted polymeric material.

The feed composition may be provided to the assembly 100 by any known feed mechanism, such as known for providing polymer feed to an extruder. Such feed mechanism may include a hopper (with or without a shaking or vibrating component) and an auger assembly or other screw-type feed mechanism and optionally include a known means for excluding or removing air. The means for excluding air may include purging with nitrogen or other gas which is not reactive with the feed composition, and/or may include simple compaction of the feed composition to "squeeze out" air. A feed mechanism 110 is schematically illustrated in FIG. 1. In one embodiment, the feed mechanism 110 includes a tapered auger.

In one embodiment, the process further includes one or more of compacting the feed composition, e.g., when provided in a low bulk density form to reduce content of air and/or moisture; maintaining the feed composition in a reduced oxygen atmosphere; removing moisture from the feed composition; removing one or more non-polymeric contaminant from the feed composition; removing air from the feed composition and comminuting the feed composition. These additional process steps can be carried out by known methods of handling feed compositions such as plastic or polymeric materials, either in the virgin or recycled form. In one embodiment, the feed composition is fed to the process with none of the foregoing pretreatments. That is, in such an embodiment, the feed composition is used in an as-received condition. In one embodiment, the only pretreatment is sorting the feed composition to remove undesirable polymers, such as the aforementioned PVC or CPVC, or polymers containing high loadings of compounds containing atoms such as sulfur or nitrogen in the polymer.

The thermal decomposition assembly 100 includes a viscous shear apparatus 112. In one embodiment, the viscous shear apparatus 112 includes a single screw extruder, shown schematically in FIG. 1. In another embodiment, the viscous shear apparatus 112 includes a twin screw extruder. As schematically illustrated in FIG. 1, the apparatus 112 is rotatably driven by, e.g., an electric motor 114 and appropriate gearing for rotation of a shaft 116 on which are mounted a plurality of blades or flights 118. The viscous shear apparatus 112 heats the feed composition by the shear forces applied to the feed composition by the blades 118 of the extruder. In one embodiment, the only heat source in the apparatus 112 is the shear applied by the blades 118. In one embodiment, the apparatus 112 is covered by an external layer of insulation to enhance retention of heat generated in heating of the feed composition. In one embodiment, no external heat source is used with the apparatus 112. In one embodiment, the viscous shear apparatus 112 further includes externally applied heat, such as provided by one or more heating means such as a band heater or similar known extruder heating device, mounted external to the device. In one embodiment, the viscous shear apparatus 112 includes a vent or releasing accumulated gases, such as entrapped air.

In one embodiment, the temperature of the material exiting the viscous shear apparatus 112 is in the range from about 460° F. (about 238° C.) to about 600° F. (about 316° C.). In one embodiment, the temperature of the material exiting the viscous shear apparatus 112 is about 560° F. (about 293° C.). The feed composition is generally fed to the viscous shear apparatus 112 in a solid state, at ambient or room temperature, or somewhat above room temperature, depending on any processing prior to the feed step. In one embodiment, when the feed composition has been shredded in a cryogenic process, it is fed to the viscous shear apparatus 112 at a temperature below ambient. Alternatively, if the feed composition has been chopped or ground in a non-cryogenic process, it may be above ambient temperature when fed to the apparatus 112. Various pretreatments are disclosed below.

As shown in FIG. 1, the feed composition exits the viscous shear apparatus 112 via a pipe or tube 120 and continues into the ribbonchannel reactor 122. When the feed composition exits the apparatus 112, it is in a semisolid state, having been heated to an elevated temperature and thereby softened. It is generally not completely in the liquid state and may not be considered to be molten, but is instead a viscous flowable or pumpable material. As will be understood, the feed composition is usually a mixture of polymers, and polymers generally and mixed polymers especially include a relatively wide range of molecular weights. Therefore, some portion of the material might be considered to be a liquid or molten, while some parts may be substantially solid and yet other parts may be not actually molten but softened sufficiently, that the whole mass is sufficiently flowable or pumpable to be moved into the ribbonchannel reactor. The material as a whole is flowable and pumpable upon exit from the viscous shear apparatus 112, as it has to be transferred from the apparatus 112 to the ribbonchannel reactor 122.

In one embodiment, the viscous shear apparatus 112 includes a small orifice, commonly referred to as a die, to maintain a high pressure and shear inside the apparatus. In one embodiment, the viscous shear apparatus 112 includes a die having a variable size orifice which can be used to control both the temperature and the flow rate of the feed composition exiting the viscous shear apparatus 112. In one embodiment, the viscous shear apparatus 112 may include an orifice cleaning device, to assist in clearing pieces of metal not removed from the feed material by a magnet (where such is used to remove ferromagnetic materials). Such non-removed metals may include, of course, non-ferromagnetic metals, such as aluminum. The orifice cleaning device may be manually operated or automatically operated.

It is noted that at least a portion, and in one embodiment, substantially all, of the driving force for passage of the feed composition through the ribbonchannel reactor 122 is provided by the viscous shear apparatus 112. Without the force applied by the viscous shear apparatus 112, there may be a lower flow rate of the feed composition through the ribbonchannel reactor 122. It is recognized that the spirally mounted low height flighting will act to carry the feed composition in the ribbonchannel reactor to some extent, but the viscous shear apparatus 112 may also contribute to the transport of the material through the ribbonchannel reactor.

As indicated in FIG. 1, the temperature of the feed composition (and of the intermediate or final products of its decomposition) increases from the proximal or feed end to the distal end of the ribbonchannel reactor 122. In one embodiment, the temperature of the heating elements applied to both the inner heated hollow cylinder 124 and the outer heated hollow cylinder 126 is substantially constant from the proximal end to the distal end. In other embodiments, different temperatures and quantities of heat applied may vary along the length of the cylinders. However, for simplicity and efficiency, the heat is generally applied at a substantially uniform temperature to the cylinders from the proximal end to the distal end. As will be understood, the amount of heat absorbed varies with the temperatures of both the heat source and the target to which the heat is applied.

Referring still to FIG. 1, the ribbonchannel reactor 122 includes an inner heated hollow cylinder 124 and an outer heated hollow cylinder 126. The inner heated hollow cylinder 124 has an outer cylindrical surface, and the outer heated hollow cylinder 126 has an inner cylindrical surface. The outer cylindrical surface and the inner cylindrical surface, respectively, are opposite to and face each other when the inner heated hollow cylinder 124 is operably mounted within the hollow space in the outer heated hollow cylinder 126.

In one embodiment, the inner heated hollow cylinder 124 is rotatable within the outer heated hollow cylinder 126, which remains stationary. In another embodiment, the outer heated hollow cylinder 126 may be rotated about the inner heated hollow cylinder 124, which remains stationary in this embodiment. As will be recognized, it is simpler to rotate the inner heated hollow cylinder 124 while the outer cylinder 126 is held stationary. The rotation of the inner heated hollow cylinder 124 is illustrated in FIG. 1, in which an electric motor 128, via appropriate gearing, rotates a stub shaft 130 to which the inner heated hollow cylinder 124 is attached for rotation within the hollow interior of the outer heated hollow cylinder 126. Although not shown, the inner heated hollow cylinder may be mounted on a suitable stub shaft at the distal end, and both stub shafts include suitable gearing, bearings and mountings.

In accordance with the invention, both the inner heated hollow cylinder 124 and the outer heated hollow cylinder 126 include heating elements or are otherwise heated to provide heat for increasing the temperature of the feed composition, for the purpose of converting the feed composition into (a) a vapor fraction and (b) a solid residue fraction. Thus, the present invention provides and applied two-sided heating to the ribbon of feed composition in the ribbonchannel. In one embodiment, both heated hollow cylinders 124, 126 are heated electrically, e.g., by electric resistance heaters. The heat sources are described in more detail below.

Although not described in detail here, it is possible to heat either or both of the hollow cylinders by direct gas firing. In one embodiment, the gas used for such gas firing may be the non-condensable gas recovered from the process, described in more detail below. In one such embodiment, sufficient non-condensable gas is obtained as a by-product of the inventive process to provide heat for the entire process. In one such embodiment, sufficient non-condensable gas is obtained as a by-product of the inventive process to provide both heat for the entire process and to operate an electric generator sufficient to provide the electrical needs of the apparatus as well. These embodiments may be realized even when obtaining the maximum yield of hydrocarbon material product relative to the quantity of the feed composition, which yield may be as high as 75%, and in one embodiment, from about 65% to about 75% yield. That is, in these embodiments, it is not necessary to divert any of the sought hydrocarbon material product for this heating; rather this heat can be provided solely by the relatively low value non-condensable gases.

In one embodiment, the outer heated hollow cylinder 126 is mounted inside an insulated container. In one such embodiment, the outer heated hollow cylinder 126 and, to some extent, the entire ribbonchannel reactor 122, is heated by a system of electric heating elements embedded in and extending from ceramic fiber modules arrayed inside the insulated container, such as that described below with respect to FIGS. 6-8. An example of such a heating system is the Pyro-Bloc® Electric Element Support system available from Thermal Ceramics, Augusta, Ga. Such heating system is described in U.S. Pat. No. 4,154,975, the disclosure of which is incorporated by reference.

In one embodiment, electrical heating elements are arrayed in the interior cavity of the inner heated hollow cylinder 124.

In one embodiment, the electric heating elements are capable of providing heat up to about 2400° F. (about 1316° C., measured by the temperature of the heating element itself). In practice this temperature is usually up to about 2150° F. (about 1177° C.). In one embodiment, the operating temperature inside the insulated container (see, e.g., FIGS. 6-8) is about 1400° F. (about 760° C.). While the feed composition does not generally reach such temperature, in order to obtain suitable heat transfer rates, the heat source may be at considerably higher temperature than the temperature reached by the feed composition and/or any materials remaining at the end of the pyrolysis and degradation. The temperature of the material inside the ribbonchannel reactor, in one embodiment, reaches about 975° F. to about 1000° F. (about 524° C. to about 538° C.). Conventional extruders generally cannot operate at such temperatures.

In one embodiment, the inner heated hollow cylinder 124 contains electrical resistance heating elements arrayed in its hollow interior space. In one embodiment, the heating elements may be arrayed closely adjacent (but generally not in contact with) the inner walls of the inner heated hollow cylinder 124. In one embodiment, insulating material is provided in the interior space, and in one embodiment, heating elements such as the Pyro-Bloc® Electric Element Support system is provided in the interior space of the inner heated hollow cylinder 124 with the electric heating elements arrayed on the outer surface of the support system, facing the inner surface of the inner hollow heated cylinder. It may be advantageous to use the same type heating system for heating both the interior of the inner heated hollow cylinder 124 and the exterior of the outer heated hollow cylinder 126. Insulating material adds to the efficiency of heat transfer, since the entirety of the interior space of the inner hollow cylinder 124 would not need to be heated.

In an alternate embodiment, electrical heating elements may be arrayed on or placed adjacent an outer surface of the outer heated hollow cylinder 126. In one embodiment, electrical heating elements are arrayed within the walls of the inner heated hollow cylinder 124.

In one embodiment, the heaters may be electric band heaters. As is known, band heaters are ring-shaped heating devices that clamp around a cylindrical element, and heat transfer is by conduction. Band heaters can clamp around the outer surfaces of a cylinder, or can be mounted against the inner surfaces of a hollow cylinder. In one embodiment of the present invention, band heaters are used to heat both the outer heated hollow cylinder and the inner heated hollow cylinder. While band heaters are usually equipped with some insulation, in some embodiments of the present invention, additional insulation is provided as described herein. Ceramic band heaters may be used up to a temperature of about 1200° F. (about 649° C.), and stainless steel band heaters with mineral insulation have a maximum operating temperature of about 1400° F. (about 760° C.). Either of these type band heater provide a suitable temperature range for use with the present invention.

In one embodiment, the ribbonchannel reactor 122 includes a single heating zone. In another embodiment, the ribbonchannel reactor 122 includes at least two zones of sequentially increasing temperature. In both such embodiments, the temperature of the feed composition increases as the feed composition passes through the ribbonchannel reactor.

As schematically shown in FIG. 1, in an embodiment in which electric heaters are placed adjacent or in contact with the outer heated hollow cylinder 126, insulation 132 may be provided around the ribbonchannel reactor 122. The insulation 132 may be provided as a direct-contact jacket mounted either in full or partial contact with the outer surface, or as a larger container surrounding but not contacting the outer surface, of the ribbonchannel reactor 122, as described below with respect to FIGS. 3 and 6-10.

The following relates to temperatures of the feed composition. The present inventor has discovered that the feed composition is molten only in a relatively narrow temperature range before it begins to decompose. The actual temperature range at onset of decomposition may vary depending on the mixture of polymers in the feed composition. In one example, the feed composition was found to remain in the semisolid, flowable or pumpable but non-molten state up to a feed composition temperature of about 694° F. (about 367° C.) above which it becomes more "molten" with a lower viscosity and remains in a relatively stable (non-decomposing) molten state up to a feed composition temperature of about 740° F. (about 393° C.), where it begins to decompose as indicated by foaming and onset of production of condensable hydrocarbon gases. Some off-gassing may occur between the temperatures of 694° F. (about 367° C.) and 740° F. (about 393° C.). Thus, in one exemplary embodiment, the feed composition is heated to a feed composition temperature in the range from about 460° F. (236° C.) to about 600° F. (316° C.) in the viscous shear apparatus 112, is flowed into the ribbonchannel reactor 122, therein is heated up to about 740° F. (about 393° C.) and subsequently is further heated until the material reaches a temperature of about 975° F. (about 524° C.), at which point substantially all of the feed composition has decomposed into the sought hydrocarbon material and some amount of dry char remains, in the ribbonchannel reactor. The dry char may include carbonized material, dirt, small pieces of metal, etc. It is noted that these are exemplary feed composition temperatures, and the actual temperatures depend on factors such as, e.g., on the mixture of polymers or other materials in the feed composition.

In one embodiment, the operating pressure in the ribbonchannel reactor is above ambient pressure. In one embodiment, the pressure in the ribbonchannel reactor is from about 1 to about 30 in. of water column (about 1.8 torr to about 56 torr above atmospheric pressure), which is slightly above atmospheric pressure. (1 inch of water [4° C.]=1.87 torr) In one embodiment, the process further includes collecting and condensing at least a portion of the vapor fraction. As illustrated in FIG. 1, the ribbonchannel reactor 122 further includes at least one vapor port 134 for removing the vapor fraction. The vapor fraction formed by the decomposition of the feed composition exits the thermal decomposition assembly through the one or more vapor port 134. In one embodiment, there are a plurality of vapor ports arranged along the longitudinal length of the thermal decomposition assembly through which the vapors exit the reactor. The embodiment illustrated in FIG. 1 includes two vapor ports 134. In one embodiment (not shown), there are three vapor ports. As noted above, the ribbonchannel reactor 122 may include any number of vapor ports, as long as sufficient capacity and suitable locations are provided for exit of the vapor fraction. The vapor exit port(s) 134 may be arranged at appropriate locations, as determined by the locations or regions of the ribbonchannel reactor 122 in which the vapor fraction is formed. Thus, for example, the exit ports 134 may be in the downstream or distal portions of the ribbonchannel reactor 122, when the upstream portions are primarily used for increasing the temperature of the feed composition from the temperature at which it exits the viscous shear apparatus 112 and is transferred to the proximal portion of the ribbonchannel reactor 122. The vapor exit ports 134 may be sized as appropriate to the volume of vapor to be handled.

As illustrated in FIG. 1, the vapor ports 134 are surrounded by a manifold 136 in which the vapor fraction(s) is combined and fed through a pipe or passageway 138 to one or more condenser 140. The manifold 136 extends along the length of the ribbonchannel reactor 122 for a length sufficient to collect the vapors from as many vapor ports 134 as are present. In other embodiments, more than one manifold may be used, to collect separately one or more different fractions of the vapor.

The condenser 140 is provided to reduce the temperature of the vapor fraction to a level at which the vapors condense into a liquid. As noted, there may be a series of condensers, since portions of the vapor fraction may condense at different temperatures. In one embodiment, the temperature of at least one of the condenser 140 is maintained at a temperature in the range from about 130° F. (about 54° C.) to about 170° F. (about 77° C.). In one embodiment, the temperature of at least one of the condenser 140 is maintained at a temperature of about 150° F. (about 66° C.) or slightly higher. If lower temperatures are used, the product may solidify and form a waxy fraction that can block passages in the condenser. If it is desired that the higher boiling products remain liquid, they should be maintained at a temperature of about 180° F. (about 82° C.) to about 250° F. (about 121° C.). In one embodiment, the condenser may be operated with a range of continuously or stepwise reducing temperatures, in order to obtain a fractional condensation. This would have the advantage of allowing collection of different fractions of the hydrocarbon product, and may be particularly useful in large scale operations. In one embodiment, vapors not condensed at the temperature of the condenser 140 may be passed to a subsequent condenser (not separately shown) maintained at a lower temperature, e.g., about 78° F. (about 25° C.), to condense lower-boiling fractions of the vapor fraction.

Together, in one embodiment, the manifold and the condenser are examples of means for collecting and for condensing at least a portion of the vapor fraction, respectively. Other suitable means for collecting may be used, such as multiple manifolds, direct piping from each of the one or more vapor ports, etc. Similarly, other suitable means for condensing the vapors may be employed, such as air cooling, trapping and condensing the vapor in a large container of liquid, etc.

In one embodiment, a single fraction of condensed hydrocarbon material is collected from the condenser, while in other embodiments a plurality of fractions may be separately collected (any non-condensable gas still constitutes a separate fraction). It may be advantageous to collect all of the condensable hydrocarbon material as a single fraction, e.g., to simplify handling and storage.

In one embodiment, the single fraction of condensed hydrocarbon material has a melting point of about 125° F. (about 52° C.), at which the hydrocarbon material changes from a room temperature consistency like petroleum jelly or vegetable shortening (e.g., Crisco®) to a low viscosity, easily flowable liquid with a water-like consistency. In one embodiment, the single fraction, when at room temperature, has an consistency like petroleum jelly and a brownish color.

In one embodiment, heat from the water used to cool the condenser(s) is removed by means of an adjacent "dry cooler" type heat exchanger. In one embodiment, the dry cooler heat exchanger includes a finned tube, in which the cooling is provided by air circulating around the fins. These may also be referred to as a liquid-to-air heat exchanger. In one embodiment, the system may include a wet/dry plume abatement cooling tower. In one embodiment, a "dry cooler" type heat exchanger is used in condensing at least a portion of the hydrocarbon material from the vapor fraction. Any heat recovered from the water used to cool the condenser(s) may be reused in any suitable manner.

As illustrated in FIG. 1, a portion of the vapor fraction may not be condensable even at a temperature of about 78° F. (about 25° C.), and this portion may be either condensed at an even lower temperature, or simply collected in its gaseous state. The thus-collected has my be compressed as needed. In one embodiment, the process forms a non-condensable but combustible gas containing a mixture of carbon dioxide, nitrogen and other gases, various low-boiling hydrocarbons, e.g., $C_1$-$C_5$ hydrocarbons, and possibly a small amount of higher hydrocarbons. In one embodiment, the process yields a non-condensable gas containing about 34% carbon dioxide, 14% nitrogen and other inert gases, and about 52% of hydrocarbons, including about 5% of the total non-condensable gas of hydrocarbons greater than $C_5$. The mixture of gases in this embodiment has a heat content of about 10,000 BTU/pound (about 4787 kiloJoules/kilogram (kJ/kg)). In one embodiment, the non-condensable gas contains about 50% carbon dioxide, nitrogen and other non-combustible gases and about 50% of combustible gases, which are primarily hydrocarbons. This non-condensable gas may be combusted and used to heat the ribbonchannel reactor 122.

In one embodiment, the process yields a non-condensable gas containing a higher content of hydrocarbons, and the heat content is about 13,000 BTU/pound (about 6223 kJ/kg). This non-condensable gas may be used in any manner described herein, but may be even more suitable for use as fuel, given its higher heat content.

Regarding the non-condensable gases formed in the process, the term "non-condensable" means that the gases are not condensed at a temperature of about 20° C. As will be understood, if the temperature is reduced sufficiently, any gas can be condensed. In the process as used in this invention, the non-condensable gases are simply left non-condensed, in preference to expending the energy necessary to condense these gases into a liquid form. As a result, in one embodiment, the process further includes collecting the non-condensable gases from the condenser, and using them for some purpose, such as one or more of the following. In one embodiment, the non-condensable gas is used as fuel for an electric generator used to provide electrical energy for heating the ribbonchannel reactor 122. Such a generator may be similar to a landfill gas generator, or may be another suitable known generator. In one embodiment, the use may be subjecting the non-condensable gases to one or more of combustion for direct process heat, combustion for other process heat, combustion in an internal combustion engine, compression and storage, and use in production of carbon black. In another embodiment, the non-condensable gas may be used for other purposes, such as the formation of carbon black, by combustion in low oxygen conditions in which the resulting flame is directed onto a cold surface to condense thereon carbon as carbon black. In another embodiment, the non-condensable gases may be diverted for use as fuel in unrelated other processes. The exhaust from such combustion may be useful as a purge gas in purging air from the feed material prior to its introduction to the thermal decomposition apparatus. Other uses will likely occur to the skilled person. In one embodiment, the quantity of non-condensable gases is sufficient to provide all of the energy necessary to operate the process of the present invention. In such an embodiment, the non-condensable gases may be combusted in an internal combustion engine or in a gas turbine to generate electricity for heating the apparatus. In such an embodiment, a portion of the non-condensable gases may be combusted to provide direct heat to the apparatus. Such heat may be used, e.g., to warm a fluid used for condensing the hydrocarbon materials produced by the process (which in some embodiments are condensed at temperatures higher than ambient). Thus, in such embodiments, the process may be mostly or even entirely energy self-sufficient, providing adequate quantities of heat from what would otherwise be waste materials, or materials which are not economically collected and used as a marketable product of the process. In general, it is considered that the non-condensable gas should be consumed on-site, since its relatively low heat value reduces the economic feasibility of transporting it.

As shown in FIG. 1, the hydrocarbons recovered from the condenser 140 may be used directly or indirectly in end products, such as gasoline, diesel or bunker fuel, or may be subjected to optional further processing and/or be blended with other materials to form desired products. For example, such other processing may include cracking, hydrogenation, filtering through clay or other filter medium to remove undesirable colors, odors or non-hydrocarbon components. The need for and type of such further processing can be determined on an as-needed basis by persons of skill in the art.

As illustrated in FIG. 1, the ribbonchannel reactor 122 further includes at least one solids exit port 142 at a distal portion of the thermal decomposition assembly 100, for removing the solid fraction. The exit port 142 may include suitable apparatus for preventing the ingress of air, such as an air lock 144 as illustrated in FIG. 1. The solid fraction may include char, dirt and other debris. The char may be primarily carbonaceous material formed in the process by the high heat, but also may include other compounds including, for example sulfur or nitrogen compounds, formed by decomposition of the mixture of polymers fed to the process. The debris may include metals and other materials that do not decompose into the hydrocarbon or non-condensable gas products, and decomposition of such other materials (e.g., metal oxides or compounds). As shown in FIG. 1, the apparatus may further include a cooler 145, to cool the solid fraction before it exits the apparatus into the atmosphere. Since the solid fraction is at the maximum temperature of the apparatus just before it reaches the exit port 142, it poses a fire hazard, since many of the components of the solid fraction are at least potentially combustible. Thus, the cooler 145, which may be, for example a water-cooled screw conveyor, or a water-cooled or air-cooled heat exchanger adapted for use with solids, is used to reduce the temperature of the solid fraction so that its combustibility is at least reduced before it is allowed to contact oxygen in the atmosphere. Of course, the cooler 145 may be omitted, but it is recommended that other steps be taken to avoid any potential fire hazard due to the high temperature and likely combustibility of the solid fraction.

In one embodiment, the ribbonchannel reactor 122 has an overall length in the range from about 10 feet (about 3 m.) to about 40 feet (about 12.2 m.), and in one embodiment, has an overall length from about 15 feet (about 4.6 m.) to about 25 feet (about 7.6 m.), and in one embodiment, it has a length of about 20 feet (about 6.1 m.). The reactor may be longer, but efficiency may be reduced.

Referring now to FIGS. 2-5, further details of the ribbonchannel reactor 122 are provided. As noted above, in one embodiment, the ribbonchannel reactor 122 further includes a low height flighting 146 mounted with respect to the inner heated hollow cylinder and the outer heated hollow cylinder. Thus, as noted, the low height flighting 148 may be mounted on either the outer surface of the inner heated hollow cylinder or on the inner surface of the outer heated hollow cylinder. Generally the former arrangement is used.

FIG. 2 is a schematic depiction of a partial cross-section of an embodiment of the low height flighting 146 mounted with respect to the inner heated hollow cylinder 124 and the outer heated hollow cylinder 126. The flights 148 may be welded to, or may be cast as an integral part of the inner heated hollow cylinder 124. In one embodiment, the outer radius of a hypothetical cylinder formed by the outer end of the flights 148 is almost exactly the same as the inner radius of the outer heated hollow cylinder, the difference providing only as much clearance as required for free movement of the low height flighting 146 with respect to the inner surface of the outer heated hollow cylinder 126, allowing for thermal expansion from the relatively high operating temperatures.

As shown in FIG. 2, a ribbonchannel 150 is defined by the respective flights 148, the outer surface of the inner heated hollow cylinder 124 and the inner surface of the outer heated hollow cylinder 126. The ribbonchannel 150 is the location of the ribbon of the feed composition, e.g., a polymeric material, which is subjected to the process of the present invention. Initially, at the proximal end of the thermal decomposition assembly 100, the ribbonchannels 150 are substantially filled with feed composition, but as the feed composition decomposes, the volume of decomposing or decomposed feed composition in the ribbonchannels 150 gradually decreases until only char, dirt, small pieces of metal and any other debris, if any, still remains.

Referring still to the embodiment of FIG. 2, the inner heated hollow cylinder 124 is contacted by an inner heating source 152. In one embodiment, the inner heating source 152 is an electrical heater. Other suitable heating means may be used, such as a high temperature liquid (e.g., a molten metal or alloy or a molten salt) pumped or passed through the interior of the inner heated hollow cylinder 124, or by a direct fired fuel combusted inside or near the inner heated hollow cylinder 124 and passed through it, or by indirect heating in which the combustion products pass through the hollow cylinder single or multiple times. However, it is considered that the electrical heater provides the most efficient manner of proving heat to the inner heated hollow cylinder 124. In one embodiment, the electrical heater is in direct contact with the inner surface of the inner heated hollow cylinder. In one embodiment, electric heating elements are disposed within the hollow but are not in direct contact with the inner cylindrical surface of the inner heated cylinder 124. In one embodiment, the electrical heater provides heat to substantially the entire inner surface of the inner heated hollow cylinder, or at least that part of the inner surface that is opposite the portion of the cylinder in contact with the feed composition in the ribbonchannels 150. In one embodiment, the non-condensable gas obtained from the process is used as one or the heat source for the process.

Referring again to the embodiment of FIG. 2, the outer heated hollow cylinder 126 is heated by an outer heat source 154. In one embodiment, the outer heating source 154 includes a plurality of electric heaters. Other suitable heating means may be used, such as a high temperature liquid pumped or passed around the exterior of the outer heated hollow cylinder 124, or by a direct fired fuel combusted around the outer heated hollow cylinder 124 and passed around it. However, it is considered that the electrical resistance heater provides the most effective manner of transferring heat to the outer heated hollow cylinder 124. In one embodiment, the electrical resistance heater provides heat to substantially the entire outer surface of the outer heated hollow cylinder. In one embodiment, the heater provides heat to at least that part of the outer surface that is opposite the in contact with the feed composition in the ribbonchannels 150.

In the embodiment illustrated in FIG. 2, the outer heat source 154 is in contact with an insulating material 156. As will be understood, due to the high temperatures used in the present invention, use of insulation is needed at some point in the apparatus to avoid undue loss of heat and consequent serious reduction in efficiency of the process. The insulating material 156 may be any material known in the art for providing insulation, and which is compatible with the temperatures employed in the present invention. It is noted in this regard that since the temperature of the decomposing feed composition may be at least 975° F. (524° C.), the temperature of the heating elements 152 and 154 may be considerably higher, i.e., as high as about 1400° F. (760° C.).

Referring now to FIG. 3, there is shown a schematic depiction of a partial cross-section of another embodiment of the low height flighting mounted with respect to the inner heated hollow cylinder 124 and the outer heated hollow cylinder 126. In the embodiment illustrated in FIG. 3, each of the inner heated hollow cylinder 124, the outer heated hollow cylinder 126, the low height flighting 146, the flights 148, the ribbonchannels 150, the inner heat source 152 and the outer heat source 154 are substantially the same as described above with respect to FIG. 2, so these are not described again here, for brevity. In the embodiment schematically illustrated in FIG. 3, insulation 158 is provided at a location removed from the outer surface of the outer heat source 154. Providing the insulation 158 at a location removed from the outer heat source 154 may allow easier access to the low height flighting 146 and the elements thereof for, e.g., maintenance and monitoring of performance. In another embodiment, described below with respect to FIGS. 6-9, the outer heat source 154 is not on or closely adjacent the surface of the outer heated hollow cylinder 126, but instead includes electric heating elements arrayed on and in the insulation 158, some small distance away from the surface of the outer hollow heated cylinder 126.

In one embodiment, both the insulation 156 and the insulation 158 may be used together.

An important aspect of the present invention is the relatively small thickness of the ribbon of feed composition carried in the ribbonchannel 150 between the inner heated hollow cylinder 124 and the outer heated hollow cylinder 126 and moved by the short flights mounted on the hollow cylinder. As noted above, one of the major problems in the prior art was the slow, non-uniform and/or inefficient transfer of heat from the heat source to the feed composition sought to be pyrolyzed or decomposed, due to the low thermal conductivity of the feed composition and often due to poor design of the heat transfer equipment. In the prior art, much energy was lost or wasted due to the poor heat transfer, and considerably less than optimal conversion of materials such as plastics to hydrocarbon was achieved in such systems, and/or the conversion was not energy efficient. In such systems, the apparatus was not properly adapted to optimize heat transfer to these difficult-to-heat materials. The present invention substantially overcomes that problem by the novel design of the ribbonchannel reactor.

In one embodiment of the present invention, the thickness of feed composition between the outer surface of the inner heated hollow cylinder 124 and the inner surface of the outer heated hollow cylinder 126 is about 0.75 inch (about 1.9 cm). This thickness can be obtained by selection of the respective radii of the inner heated hollow cylinder 124 and the outer heated hollow cylinder 126. To obtain an exemplary throughput of about 3000-10,000 pounds (about 1361 kg to about 4536 kg) per hour, in one embodiment, the outside diameter of the outer hollow cylinder may be in the range from about 12 inches (30.5 cm) to about 36 inches (91.5 cm). In such an embodiment, the length of the ribbonchannel reactor 122 may range from about 20 feet to about 60 feet (about 6 to about 18 meters). Increasing the flight height of the flights in the low height flighting beyond the range disclosed herein may result in a disproportionate increase in the length of the ribbonchannel reactor 122 necessary to completely decompose the feed composition. Such increase in length greatly increased both capital and operating costs. Of course, the viscous shear apparatus 112 should be appropriately sized to obtain the desired throughput in the ribbonchannel reactor 122.

Selection of the sizes of the inner heated hollow cylinder and the outer heated hollow cylinder is not limited in the invention, as long as the desired thickness of feed composition can be obtained in the ribbonchannel reactor 122. However, in actual practice, it may be preferred to use commercially available pipe for these hollow cylinders, and the relative sizes needed to provide the desired thickness of feed composition in the ribbonchannel reactor 122 may be limited by what is commercially available. In such case, to increase capacity, it may be desirable to operate multiple units rather than to increase the size of the individual ribbonchannel reactor unit. Thus, if standard "off the shelf" (i.e., not custom manufactured) pipe is used, one may be limited to, e.g., 20, 22 or 24 inch pipe (referring to outside diameter), because larger "off the shelf" pipe sizes are provided in diameters that do not have relative inner and outer radii to allow use of the low height flighting of the present invention. That is, the "gap" between incremental sizes is so great that the low height flighting cannot be used as effectively. Here, as elsewhere in the specification, pipe or hollow cylinder size is based on NPS or "Nominal Pipe Size", which is based upon the outside diameter of the pipe, and accords with ASME/ANSI B 36.10 Welded and Seamless Wrought Steel Pipe and ASME/ANSI B36.19 Stainless Steel Pipe. Useful pipe sizes may be, for example, 16, 18, 20, 22, 24, 26, 28, 30, 32, 34, 36 inches expressed as nominal outside diameter, where available. Above 36 inches, the sizes increase by intervals greater than 2 inches. Relative sizes, inside radius of outer heated hollow cylinder and outside radius of inner heated hollow cylinder also depend on the wall thickness as will be understood. Of course, it is possible to use custom-made hollow cylinders, in which case the relative radii can be selected as desired.

In one embodiment, the inner heated hollow cylinder has an outer radius, the outer heated hollow cylinder has an inner radius, and a ratio of the outer radius to the inner radius is in a range from about 0.80 to about 0.98. In the following, reference to the outer or outside radius is to that of the inner heated hollow cylinder, and reference to the inside radius is to that of the outer heated hollow cylinder.

The difference between the outer radius of the inner heated hollow cylinder and the inner radius of the outer heated hollow cylinder is relatively small. In one embodiment, the difference between these radii is in the range from about 0.25 inch to about 1.5 inch (about 0.63 centimeter (cm) to about 3.8 cm), when the outside diameter of the inner heated hollow cylinder is in the range from about 12 inches to about 36 inches (about 30.5 cm to about 91.5 cm). The flights of the low height flighting have a height sufficient to almost contact the surface of the hollow cylinder to which the flights are not attached. In one embodiment, the outer radius and the inner radius differ in the range from about 0.25 inch to about 1.5 inch (about 0.63 cm to about 3.8 cm). In one embodiment, the difference in these radii is from about 0.5 inch (about 1.2 cm) to about 1 inch (about 2.5 cm), and in one embodiment, is about 0.75 inch (about 1.9 cm). The flights on the low height flighting have a height substantially equal to, but slightly less than, the difference between the outer radius and the inner radius of the inner heated hollow cylinder and the outer heated hollow cylinder, respectively. As will be recognized, thermal expansion of the parts must be accounted for, so that in operation the clearance between the adjacent moving parts is sufficient to allow free rotation while at the same time providing a substantially wiped surface. The clearance should be as small as operationally possible, which can be determined easily by the skilled person.

In another embodiment, the ribbonchannel reactor of the present invention provides a high ratio of heated surface area to the volume of feed material being heated. Thus, in one embodiment, the ratio of heated surface area to volume of feed composition heated ranges from about 4:1 to about 1:2. In one embodiment, the ratio of heated surface area to heated volume is in the range from about 2:1 to about 1:1, and in another embodiment, the ratio of heated surface area to volume heated is about 1:0.75. Even at the lowest such ratio of heated area to volume heated, i.e., 1:4, the present invention provides a much higher ratio of heated surface area to volume of material heated than has been heretofore available in the prior art.

A variety of factors may be involved in selection of the specific sizes of the inner hollow heated cylinder and the outer hollow heated cylinder, and in determining the difference between the outer radius and the inner radius. Such factors include (a) the desired through-put of the system, e.g., in pounds per hour; (b) the density of the material, e.g., in pounds per cubic foot; (c) the process heat time, e.g. in minutes or hours; (d) the surface area, e.g., in square feet, for heat transfer; (e) the rotational speed, e.g., in RPM; (f) the length of the rotor, e.g., in feet; (g) the number of flights; (h) the volume of the ribbon, or the spaces, between the flights; (i) the overall heat transfer coefficient (U=BTU/hour·ft$^2$·$\Delta$T in F°); (j) the average temperature difference ($\Delta$T in F°) between the heat source and the heated material; and (k) available pipe sizes. All of these factors can be determined and optimized by the person of skill in the art of the present invention. The overall goal of the process is to maximize the through-put of material with a minimum of size, capital and operational cost. Determining and providing the proper difference between the outer radius and the inner radius, i.e., the height of the low height flighting, is an important factor in meeting this goal.

As disclosed in detail herein, the apparatus of the present invention includes a viscous shear apparatus, such as an extruder, in combination with the low height flighting of the ribbonchannel reactor, where the two devices are in series, with the viscous shear apparatus being used to heat the feed composition to a temperature sufficient to render it flowable, and to flow the heated material into the ribbonchannel reactor, where it is heated rapidly, efficiently and quickly to its decomposition temperature thence to form the sought hydrocarbon material products. While there are some similarities between this arrangement and two extruders in series, there are several significant differences between such prior art and the present invention. Two extruders in series, when tried, have been unsuccessful or have been un-economical. The differences may include one or more of the following. First, in one embodiment, the viscous shear apparatus of the present invention imparts heat to the feed composition only as a result of the very high shear and without application of external heat, bringing the feed composition to a temperature at which it is flowable but not fully molten. Second, in one embodiment, substantially no decomposition of the feed composition takes place in the viscous shear apparatus, despite the fact that it is operated at temperatures considerably higher than in extruders used for, e.g., injection molding or other extrusion forming processes. Third, in the ribbonchannel reactor, the low height flighting represents a significant departure both from a conventional extruder or conventional heat exchanger or heated auger. The low height flighting, in forming a relatively thin ribbon of the feed composition, is specifically designed to overcome the problems experienced throughout the prior art associated with and resulting from the low thermal conductivity of the plastic materials subjected to the process. In the prior art, where thicker layers of material were attempted to be heated to decomposition, some regions of the material would begin decomposition while other regions were still at a temperature well below the decomposition temperature. This resulted in various undesirable chemical reactions which contributed to very poor efficiency in the conversion of feed compositions to useable fuels, and also seriously detracted from the economic viability of the process, since the heating was slow and inefficient in addition to or even contributing to the often poor quality materials being obtained from the process. Finally, the apparatus and process of the present invention effectively, quickly and efficiently transforms the plastic feed material from a solid to a vapor, despite the low heat conductivity of the material. A prior art extruder is not capable of effectively vaporizing a feed composition such as a polymeric material. Thus, the present invention provides a significantly more efficient process in terms both of thermal efficiency and of quality of product obtained, both of which contribute to a much improved overall efficiency of the process of the present invention relative to any known prior art process.

Thus, in some embodiments, the differences between the present invention and the prior art are several. In the prior art, when attempting to increase throughput, people used apparatus having an increased size to provide a large material volume in process at a given time. However, the greater the material volume in process, the lower the ratio of heat source surface area to the quantity or volume of material being heated, and the greater the difficulty in heating the material uniformly and efficiently. This results in a low through-put relative to the volume in process. Such systems suffered from both poor heat transfer to the material and large heat loss, whether in batch or continuous processes. As will be recognized, the greater size necessitated substantially greater equipment and operating costs and led to poor economic viability. Economic viability has always been the bane of recycling programs, because of the volume that must be handled and the relatively low returns. Thus, the prior art processes may have been capable of rendering materials such as recycled plastics into hydrocarbon materials, but those processes were not economically viable. In order for any recycling process to be economically viable, a sufficient quantity of hydrocarbon material of a useful grade must be obtained or the recycling program will fail.

The present invention has addressed these problems by providing for a relatively small volume of material to be in the system at any given time, by providing rapid and highly efficient heat transfer in a system that exhibits high throughput and low heat loss. The system of the present invention can be operated on a continuous basis at a relatively low equipment cost and with a low heat loss. As a result of the low height flighting used in the ribbonchannel reactor of the present invention, a relatively small volume of material is in the ribbonchannel reactor of the apparatus at any given time, so that a rapid and efficient, high throughput can be achieved. The throughput can be increased to a rate sufficient to provide the economic viability needed in such a recycling process.

Referring now to FIGS. 4 and 5, embodiments of the low height flighting are further described. In the embodiments of both FIG. 4 and FIG. 5, the flights 148 are mounted spirally on the outer surface of the inner heated hollow cylinder 146.

FIG. 4 is a schematic depiction of a side view of a low height flighting 146 in accordance with an embodiment of the present invention. In the embodiment illustrated in FIG. 4, the low height flighting 146 includes a plurality of spirally oriented flights 148 extending outwardly from an outer surface of the inner heated hollow cylinder. In the embodiment illustrated in FIG. 4, the flights 148 are substantially uniformly spaced from each other, from the proximal end to the distal end of the low height flighting 146. That is, in this embodiment the flights 148 have a substantially constant pitch. In one embodiment, the flights 148 have a substantially constant pitch in the range from about 4 in. (about 10 cm) to about 10 in. (about 25 cm). In one embodiment, the substantially constant pitch ranges from about 6 in. (about 15 cm.) to about 8 in. (about 20 cm.).

FIG. 5 is a schematic depiction of a side view of a low height flighting in accordance with another embodiment of the present invention. In the embodiment illustrated in FIG. 5, the flights 148 have a variable pitch, in which the distance between the flights gradually decreases over at least some portions of the apparatus, from the proximal end to the distal end. In one embodiment, the flights 148 have a pitch in the range from about 10 in. to about 2 in., and the pitch decreases, within this range, from the proximal portion to the distal portion of the ribbonchannel reactor. In one embodiment, the pitch decreases across only some portion of this range, e.g., decreasing from about 6 in. to about 2 in., or decreasing from about 8 in. to about 4 in. For example, the pitch may decrease from an initial pitch of about 6 in. (about 15 cm) to a final pitch of about 2 to about 4 inches (about 5 cm to about 10 cm), from the proximal end to the distal end of the low height flighting. In one embodiment, the pitch between the flights remains substantially constant from the proximal end of the low height flighting 146 to the region in which the feed composition begins to decompose, and thereafter, the pitch between the flights begins to decrease for the remainder or some portion of the length of the low height flighting 146 moving towards the distal end. As will be understood, as the feed composition decomposes and vaporizes, the remaining volume of the feed composition will decrease. Providing a concomitant decrease in the flight pitch, thereby reducing the size of the ribbonchannel, may improve heat transfer and/or efficiency, since the ribbonchannels 150 will be relatively more completely filled with the feed composition in this embodiment, as compared to a uniform pitch embodiment, such as that in FIG. 4, in which the ribbonchannels have substantially the same volume and gradually become less filled as the feed composition is decomposed into the hydrocarbon material.

In the embodiments illustrated in FIGS. 4 and 5, each spirally oriented flight 148 is substantially continuous from the proximal end to the distal end of the low height flighting 146. The number of flights may range from one to about sixty, in one embodiment, from about 6 to about 20, in one embodiment, from about 8 to about 20, and in one embodiment, about 10 flights, and in another about 15 flights. The number of flights depends on factors such as the radius of the hollow cylinder upon which the flights are mounted, the angle of the spiral and the desired flight pitch. While a greater number of flights could be provided, a spacing of about six inches (about 15 cm) between flights (in a constant pitch embodiment) should provide adequate movement and exposure to heat. Thus, for example, in a 30 in. outside diameter cylinder (e.g., pipe), which has a circumference of about 94 in., for a flight spacing of about 6 in., there would be about 15 flights.

As noted, in one embodiment heat is applied uniformly to the entire length of the ribbonchannel reactor. In this embodiment, the temperature of the feed composition sought to be decomposed gradually, sequentially increases along the length of the reactor. In one embodiment, a uniform, high level of heating is applied along the entire length of the ribbonchannel reactor. In one embodiment, a level of heat as required to obtain the desired temperature increase is applied to the feed material in the ribbonchannel reactor.

In one embodiment, the sequentially increasing temperature is provided by a plurality of zones establishing a substantially stepwise increasing temperature regime from the proximal portion towards a distal portion of the ribbonchannel reactor. In this embodiment, separate heating zones are provided to apply a quantity of heat commensurate with the rate at which the heat can be absorbed by the feed composition. In one embodiment, there are two heating zones for heating the ribbonchannel reactor. In one such embodiment, a greater amount of heat is applied to the upstream, less hot or proximal end of the reactor, in order to provide rapid heating to the relatively cool material, than is applied to the downstream, hotter distal end of the reactor. As noted, in the ribbonchannel reactor the temperature increases from the proximal to the distal end.

In another embodiment, the sequentially increasing temperature is provided by substantially continuously increasing temperature zone extending from the proximal portion towards a distal portion of the ribbonchannel reactor. In this embodiment, rather than separate heating zones, a continuously increasing amount of heat is applied, in order to apply a quantity of heat commensurate with the rate at which the heat can be absorbed by the feed composition.

In one embodiment, material through-put can be increased simply by increasing the length of the increasing temperature zone and rotating the inner heated hollow cylinder at a higher speed FIG. 6 is a diagrammatic top plan view of an embodiment of a thermal decomposition assembly 600 for carrying out the method in accordance with the present invention. Similar to the assembly 100 in FIG. 1, the assembly 600 is fed through a feed mechanism 610 and includes a viscous shear apparatus 612. In the embodiment shown in FIG. 6, the viscous shear apparatus 612 includes a single screw extruder. As schematically illustrated in FIG. 6, the apparatus 612 is rotatably driven by, e.g., an electric motor 614 and appropriate gearing for rotation of a shaft 616 on which is mounted the viscous shear apparatus 612. The viscous shear apparatus 612 heats the feed composition by the shear forces applied by blades (not shown) of the apparatus 612 to the feed composition. In the embodiment shown in FIG. 6, the apparatus 612 is surrounded by an insulated container 632 to enhance heating of the feed composition. As shown in FIG. 6, the feed composition exits the viscous shear apparatus 612 via a pipe or tube 620 and continues into the ribbonchannel reactor 622 (not shown in FIG. 6, see FIGS. 7 and 8 below), inside an insulated furnace 650, which is lined with insulation and includes heating devices, such as electric heating elements. Similar to the embodiment of FIG. 1, the embodiment of FIG. 6 includes an electric motor 628, appropriate gearing, and a shaft 630 operably connected to the ribbonchannel reactor 622. In the embodiment shown in FIG. 6, the vapors formed in the ribbonchannel reactor 622 are collected and pass through a pipe or passageway 638 to one or more condenser 640. The electric motors may be operated at variable speed.

FIG. 7 is a diagrammatic view of the apparatus 600 of FIG. 6 taken from the direction indicated by the arrow 7 in FIG. 6, but also including a cross-sectional view of the insulated container 632, at about line 7-7 in FIG. 6. FIG. 8 is a diagrammatic view of the apparatus 600 of FIG. 6 taken from the direction indicated by the arrow 8 in FIG. 6, but also including a cross-sectional view of the insulated container 632, at about line 8-8 in FIG. 6. Most of the elements shown in FIGS. 7 and 8 are also shown in FIG. 6, are described above, and are not further described here.

As shown in FIGS. 7 and 8, the apparatus 600 contains the ribbonchannel reactor 622 in the furnace 650, which is lined with the insulation 632. As shown in FIGS. 7 and 8, the apparatus 600 includes a char exit 642 and an air lock 644. Also shown in FIGS. 7 and 8 is a receiving container 652 in which hydrocarbons formed in the ribbonchannel reactor 622 and condensed in the condenser 640 are collected. The container 652 further includes a non-condensable gas outlet 654, through which non-condensable gases can be routed to a storage container or other apparatus (not shown). The container 652 further includes a drain 656, as shown in FIG. 7. In one embodiment, the container 652 may contain water, so that gases such as carbon dioxide, sulfur compounds, etc., in the non-condensable gas may dissolve in the water and thus be "washed" from the gas. As shown in both FIGS. 7 and 8, in one embodiment, the ribbonchannel reactor 622 is heated by electrical heating elements 658 arrayed on and/or in the insulating material 632. In one embodiment, described above, the heating system includes a Pyro-Bloc® Electric Element Support system.

In one embodiment, variable power for rotation of the viscous shear apparatus 612, e.g., the electric motor 614, is provided, so that the rotational speed and the rate of through-put of the feed composition can be adjusted as needed, in accordance with operational factors such as the nature or the density of the feed material. In one embodiment, variable power for rotation of the ribbonchannel reactor 622, e.g., the electric motor 628, is provided, so that the rotational speed and the rate of throughput of the feed composition can be adjusted as needed, in accordance with operational factors, such as the nature or the bulk density of the feed material. In one embodiment, both power sources are provided with variable frequency drives, to provide the variable power, to maintain synchronized through-put between the viscous shear apparatus and the ribbonchannel reactor as well as to adjust for variations in operational factors, such as those mentioned above.

Figure 9:
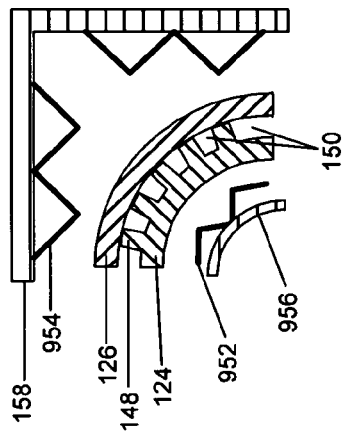
FIG. 9 is a schematic depiction of a partial cross-section of another embodiment of the low height flighting mounted with respect to the inner heated hollow cylinder and the outer heated hollow cylinder.

FIG. 9 is a schematic depiction of a partial cross-section of another embodiment of the low height flighting mounted with respect to the inner heated hollow cylinder and the outer heated hollow cylinder. In FIG. 9, there is shown a schematic depiction of a partial cross-section of an embodiment of the low height flighting 146 mounted with respect to the inner heated hollow cylinder 124 and the outer heated hollow cylinder 126. As schematically depicted in FIG. 9, in one embodiment the low height flighting 146 includes flights 148 mounted on or attached to the inner heated hollow cylinder. The flights 148 may be welded to or cast as an integral part of the inner heated hollow cylinder 124. The same close relationship between the outer radius of the flights 148 and the inner radius of the outer heated hollow cylinder is shown, as described above with respect to FIG. 2, and as in the embodiment of FIG. 2, in the embodiment of FIG. 9, the ribbonchannels 150 are defined by the low height flighting on either side, the outer surface of the cylinder 124 and the inner surface of the cylinder 126. See also FIG. 10 in this respect. The ribbonchannel 150 is the location of the feed composition (e.g., polymeric material) which is subjected to the process of the present invention. In the embodiment of FIG. 9, the ribbonchannel reactor is disposed within an insulated container 158. In this embodiment, heat is provided in the interior of the hollow inner heated cylinder 124 and in the interior of the insulated container 158 surrounding the outer heated cylinder 126 and the ribbonchannel reactor generally, by electrical heating coils 952 and 954. The heating coils 952 are in the interior of the inner heated hollow cylinder 124. The heating coils 954 are mounted on the walls of the insulated contained 158, in the embodiment illustrated in FIG. 9. In one embodiment, the heating coils 952 are mounted on an insulating material 956 as described above. It is noted that since the temperature of the decomposing feed composition may be at least 975° F. (about 524° C.) to 1000° F. (about 538° C.) or more, the temperature of the heating elements 952 and 954 are much higher (e.g., about 2100° F. (1149° C.) or more, and the temperature of the space in which these elements are arrayed, may be, e.g., up to about 1400° F. (760° C.) or more. In one embodiment, suitable means for providing convection heating inside the chamber may be provided, such as an electrically driven fan.

Not shown in the drawings, but associated with some embodiments of the apparatus of the present invention, are electrical controls; a bail breaker, for breaking apart bales of recycled materials such as plastics; a shredder for reducing to an easily handled size (e.g., about ¼ to ½ inch (about 0.63 to about 1.3 cm)) the materials fed to the apparatus; a magnet for attracting and removing ferromagnetic materials which may be inadvertently mixed in with the plastics; a means (e.g., container, conveyor or other solids handling equipment) for removing the char; a means (e.g., piping) for removing the hydrocarbon products; and a suitable chiller or cooling apparatus and associated piping for providing cooling water to the condenser. In other embodiments, associated with the apparatus may also be a suitable apparatus for washing or rinsing the materials, prior to being fed to the apparatus. In one embodiment, other than shredding and exposing the materials to a magnet, no other pretreatment, such as cleaning, is carried out. In one embodiment, the apparatus may further include apparatus for purging air from the feed materials, to exclude oxygen from the process. In this regard, it has been found that providing a vent in the viscous shear apparatus is usually sufficient to exclude air from the pyrolysis part of the process. Such additional associated items can be easily determined and selected by a person of ordinary skill in the art.

As noted above, the process and apparatus of the present invention are highly efficient in the conversion of plastics to fuel. In one embodiment, at least 70 percent by weight of the polymeric material provided to the process is recovered as hydrocarbon material. In one embodiment, the hydrocarbon material obtained is a high viscosity hydrocarbon, and in one embodiment, the hydrocarbon is a crude mixture, and in one embodiment has at least some characteristics of crude petroleum, such as being a complex mixture of components and/or having a noticeable odor. In some embodiments, depending to some degree on the nature of the feed, the hydrocarbon material obtained may be used directly. In other embodiments, the hydrocarbon material may be further treated, such as by clay filtration, refining (e.g., distilling), cracking (e.g., catalytic cracking), etc., as may be needed to improve the quality or useful properties of the material. That is, for example, if the hydrocarbon material recovered has disagreeable color or odor, these may be removed by clay or other types of filtration. As another example, if the hydrocarbon material has a flash point which is either too high or too low, it may be blended with other hydrocarbon materials to achieve the desired properties. In one embodiment, at least 70 percent by weight of the polymeric material provided to the process is recovered as a hydrocarbon material and is further refined. In one embodiment, the process further includes condensing the vapor fraction to obtain a hydrocarbon material and blending the hydrocarbon material with another hydrocarbon material. In one embodiment, the hydrocarbon material obtained from the process includes about 35% diesel-grade hydrocarbon and the remainder is a bunker-C grade hydrocarbon. In one embodiment, the hydrocarbon material obtained is useful as a motor oil base stock. In one embodiment, the hydrocarbon materials recovered from the process of the present invention is a fuel grade hydrocarbon. That is, for example, the content of impurities, such as sulfur and/or non-hydrocarbon materials, meets industry standards for fuel-grade hydrocarbon materials.

In one embodiment, a catalyst is used in the process as an aid to decomposition of the feed materials. In one embodiment, a catalyst is added to reduce the molecular weight of the feed material so as to obtain a product having a lower molecular weight range and/or to reduce the melting point of the product. As noted above, in one embodiment, a single product is obtained, having a consistency like petroleum jelly or vegetable shortening at room temperature. In one embodiment, addition of a catalyst results in the formation of a product having a substantially lower melting point and lower room temperature viscosity. The catalyst may be added in any appropriate ratio, as needed to obtain the desired reduction in melting point and/or molecular weight on the hydrocarbon material product. Thus, for example, the catalyst may be added at a rate in the range from about 0.1 wt % to about 20 wt. % based on the weight of the feed material to which the catalyst is added. In another embodiment, the catalyst may be added at a rate in the range from about 1 wt % to about 10 wt. % based on the weight of the feed material to which the catalyst is added. Of course, the amount and specific identity of the catalyst depend on economics and efficiency of the catalyst, and the amount of catalyst added should be the minimum required to obtain the desired results.

In one embodiment, the catalyst includes one or more of fly ash, treated fly ash, HY zeolite, mordenite and silica-alumina.

In one embodiment, the catalyst includes fly ash. In one embodiment, the fly ash is added in an "as is" condition, i.e., as collected by, e.g., the operator or an electricity generation operation, without further treatment. In one embodiment, the fly ash is treated with lime and/or caustic soda. In one embodiment, the fly ash is treated in NaOH solution for 24 hours, washed with distilled water and dried. In another embodiment, the fly ash, either treated with lime and/or caustic soda or not treated, is impregnated with nickel nitrate solution. Such impregnation may increase the cracking capability of the catalyst. The fly ash may contain, for example, depending on the source of the fly ash (e.g., bituminous, sub-bituminous or lignite coal) about 20-60% silicon dioxide, about 5-35% aluminum oxide, about 4-40% iron oxide, about 1-40% calcium oxide, and minor amounts of other components. Fly ash may differ from one source to another and with time.

In one embodiment, the catalyst includes an HY Zeolite, which is the acid form of Y-zeolite. The acid form of Y-zeolite ("HY") may be prepared by heating Linde $NH_4$ Y Zeolite (LZY-82, Union Carbide) from 25° C. to 350° C. in high vacuum over a period of 5 hours. In one embodiment, the HY zeolites used in the catalyst are acid-treated crystalline aluminosilicate Y zeolites. U.S. Pat. No. 3,130,007, the disclosure of which is hereby incorporated by reference in its entirety, describes Y-type zeolites having an overall silica-to-alumina mole ratio between about 3.0 and about 6.0, with a typical Y zeolite having an overall silica-to-alumina mole ratio of about 5.0. In one embodiment, the catalyst may be one such as described in U.S. Pat. No. 5,648,700, the disclosure of which regarding such catalysts is incorporated herein by reference. The HY Zeolite may contain, for example about 75% silicon dioxide, about 24% aluminum oxide, about 1% sodium oxide traces of iron (usually as oxide), and minor amounts of other components.

In one embodiment, the catalyst includes mordenite, which is a zeolite containing hydrated calcium sodium potassium aluminum silicate. The mordenite may contain, for example, about 92% silicon dioxide, about 8% aluminum oxide and minor amounts of other components. The general chemical formula of mordenite is $(Ca, Na_2, K_2)Al_2Si_{10}O_{24}\cdot 7H_2O$, with the actual amount of Ca, Na and K depending on the source of the mordenite.

In one embodiment, the catalyst includes synthetic silica/alumina. Silica-alumina is also known as alumino-silicate, and is an oxide-like combination of aluminum, silicon and oxygen. Silica/alumina may contain about 87% silicon dioxide and about 13% aluminum oxide.

Other catalysts known for use in breaking carbon-carbon bonds may be used, if economics and efficiency allow.

The catalyst may be added at any point in the process, prior to the actual decomposition of the feed composition in the ribbonchannel reactor, as shown in FIG. 12 (described in more detail below). In one embodiment, the condensed hydrocarbon material which is the product of the process is not further treated with a cracking-type catalyst.

In one embodiment, the catalyst is provided to the apparatus of the present invention with the dry feed material, prior to melting. In one embodiment, the catalyst may be combined with the feed material prior to the point at which the feed is macerated. This treatment helps to fully mix the catalyst with the feed material.

In another embodiment, the catalyst is added to the feed material in the viscous shear apparatus. The catalyst may be added at either end of the viscous shear apparatus, or at a selected point along the longitudinal axis of the viscous shear apparatus.

In another embodiment, the catalyst is added to the feed material entering or already in the ribbonchannel reactor. In this embodiment, the catalyst would usually be added at the point in the ribbonchannel reactor which the molten feed material enters the reactor. Of course, the catalyst could be added at other points along the longitudinal axis of the ribbonchannel reactor, as needed to obtain the desired decomposition of the feed materials. The catalyst may be added to the feed material as it is transferred from the viscous shear apparatus to the ribbonchannel reactor.

In one embodiment, use of the catalyst reduces the time and/or temperature needed for the feed composition to be transformed into the hydrocarbon material in the ribbonchannel reactor. Thus, for example, as disclosed above, in one embodiment, the temperature of the material in the ribbonchannel reactor may reach a temperature in the range from about 975° F. to about 1000° F. (about 524° C. to about 538° C.), and the onset of decomposition is at about 740° F. (about 393° C.) to about 840° F. (about 450° C.). By use of the catalyst, the temperature of the onset of decomposition may be reduced by about 30° C. or more, up to a reduction of about 50° C., and the time needed for a given quantity of feed material to be processed can be reduced as well. More importantly, by use of the catalyst, the molecular weight of the hydrocarbon material produced can be reduced, resulting in a product with a lower melting point and more easily useable as a liquid fuel, such as diesel or gasoline. Of course, as will be recognized, the composition of the feed material may have a significant effect on the type of product obtained, and use of the catalyst may provide a more desirable product in some cases than in others.

FIG. 12 is a generalized flow diagram of a process in accordance with one embodiment of the present invention. As depicted in FIG. 12, in Step 1200, the process may include providing incoming material, such as recycled plastic or other polymeric material, as described in detail hereinabove.

The incoming material provided in the Step 1200 is optionally treated by one or more of cleaning, sorting, and removing undesirable material from the incoming material, as shown in Step 1202. The treatment in the Step 1202 may include cleaning the incoming material, e.g., by water washing, to remove dirt, sorting the incoming material into two or more groups of materials, e.g., based on the type of polymer, and removing undesirable materials, such as metals or plastics such as PVC or CPVC that may produce undesirable by-products on thermal decomposition. The optional treatment in the Step 1202 may include any other pre-treatment of polymeric materials commonly used in recycling operations, which are not exhaustively enumerated here, for brevity. In one embodiment, when the feed material comprises PVC and the PVC is not separated or otherwise removed from the feed material, a base-containing material such as caustic soda or lime may be added to the feed material to neutralize and thus at least partially offset problems that may arise as a result of formation of hydrochloric acid (HCl) during the decomposition of the PVC. The base can react with the HCl to form a salt which, while still somewhat corrosive, is less corrosive than is HCl, and is much less volatile than HCl, which is a gas under normal conditions.

The feed material obtained from the Steps 1200 and 1202 is thus ready for providing to the process, as shown in Step 1204. As shown in Step 1206, the feed material may be mixed and/or macerated. In one embodiment, the incoming material is already in a small particle size, suitable for feeding to the next step, so the Step 1206 may be not needed and omitted. On the other hand, if the incoming material has a relatively large particle size, more extensive grinding, cutting or other maceration may be needed and applied to the incoming material. In the Step 1206, the mixing, when applied, serves to make the feed material more uniform and may be used to mix in any additives, such as described below.

Referring still to FIG. 12, in Step 1208 the feed material is heated to melting or into a flowable condition, in a viscous shear apparatus, such as an extruder. Detailed description of suitable viscous shear apparatus has been provided hereinabove. As will be recognized, in the Step 1208, the feed material is heated to a temperature at which the material is molten or at least has a viscosity such that the material is flowable under the conditions. The heating is provided as described hereinabove, and serves to further mix and make uniform the feed material, but generally does not result in any substantial decomposition. The heating in the viscous shear apparatus in the Step 1208 is sufficient to enable transfer as a flowable liquid from the viscous shear apparatus into the ribbonchannel reactor, as shown in Step 1210 in FIG. 12. The Step 1210, in one embodiment, is simply a passive transfer of the molten feed material through a suitable conduit, from the viscous shear apparatus to the ribbonchannel reactor. In another embodiment (not shown), the molten feed material may be pumped in this transfer Step 1210.

As shown in FIG. 12, in Step 1212, the feed material is heated to decompose the feed material and to generate therefrom a vapor comprising a hydrocarbon material, in accordance with an embodiment of the present invention. As described hereinabove, the feed composition, which includes one or mor materials decomposable into a hydrocarbon material, is flowed into the ribbonchannel reactor, and is formed into a spiral ribbon. This spiral ribbon of feed material is heated to generate the vapor including the hydrocarbon material, in the Step 1212.

As shown in FIG. 12, in an optional Step 1214, a catalyst may be added to the feed material at any point from the Step 1204 to the Step 1212. In one embodiment, the catalyst may be added at the Step 1200, if there is no Step 1202 or if the catalyst would not be removed by any treatment included in the Step 1202. Thus, the Step 1214 may be carried out at essentially any point in the process prior to the onset of decomposition of the feed material in the ribbonchannel reactor in the Step 1212. Suitable catalysts may include any catalyst known for use in decomposition of polymeric feed materials, including in one embodiment, fly ash, as described in more detail above.

As a result of the Step 1212, a vapor is formed from the decomposition of the feed material in the ribbonchannel reactor, and the products are collected in Step 1216. The collection in the Step 1216 may include, for example, use of one or more vapor ports in the ribbonchannel reactor and one or more manifold to collect the vapors, as described in more detail above.

As shown in Step 1218, the vapor products are treated to condense hydrocarbons and to separate any non-condensable gas. In the Step 1218, a portion of the hydrocarbons may be condensed at various temperatures, and some portion of the hydrocarbons may be included in the non-condensable gas, as described above. In one embodiment, the hydrocarbons which are condensed, are all condensed at a single temperature. In one embodiment, the hydrocarbons which are condensed are condensed at more than one temperature, i.e., at a plurality of gradually decreasing temperatures, to provide a crude fractionation. Thus, for example, the hydrocarbons may be condensed at a first, higher temperature, at which heavier hydrocarbons are condensed and still-vaporous lighter hydrocarbons are passed to a further condensing step and are then condensed at a second, lower temperature. The second, lower temperature may not be sufficiently low to condense all hydrocarbons. For example, if hydrocarbons are included, such as methane, ethane, propane and butane, that are gaseous at standard temperature and pressure, in the Step 1216 these may be passed off with the non-condensable gases. In another embodiment, a third condensing step may be included, at a third, lower temperature, sufficient to condense at least some of the lighter hydrocarbons, but in which some non-condensable gases remain in the gas state.

As shown in Step 1220, in one embodiment, the non-condensable gases obtained from the Step 1218 are collected. As shown in Step 1222, these non-condensable gases may be combusted for production of electricity, heat generation, carbon generation, etc., as described in detail above. Alternatively, in another embodiment (shown by the arrow from the Step 1218 to the Step 1222 in FIG. 12) these non-condensable gases may be directly combusted for these purposes, without being collected in a separate step, thus bypassing the Step 1220.

As shown in FIG. 12, in one embodiment, the hydrocarbons collected in the Step 1218 may be directly useable as "reusable hydrocarbons". In the process according to one embodiment the present invention, at least a portion of the hydrocarbons collected in the Step 1218 are directly useable without further treatment.

As shown in Step 1224, in the process in accordance with another embodiment of the present invention, the hydrocarbons obtained from the process are subjected to further treatment to render them suitable for a given purpose. In some cases, this may include one or more of fractional distillation, washing, drying, filtering with one or more filter aids to improve color, odor or other physical characteristics, hydrogenation, blending with other hydrocarbons and any other treatment that may be needed to obtain a desired reusable hydrocarbon product.

In one embodiment (not specifically shown in FIG. 12), the optional further processing includes returning some or all of the condensed hydrocarbon material to the ribbonchannel reactor, to provide "another pass" through the decomposition process, thereby to further reduce the molecular weight and melting point of the hydrocarbon material product. In this embodiment, the hydrocarbon material recovered from the initial pass through the process may be fed back into the ribbonchannel reactor together with the softened feed material exiting the viscous shear apparatus or, alternatively, may be mixed with the feed material upstream of the viscous shear apparatus. Since the hydrocarbon material recovered from the initial pass through the process has a much lower viscosity than the original feed material, it need not be passed through the viscous shear apparatus, but can be if this is simpler or preferred for some other reason, such as being a carrier or vehicle to assist in feeding the feed material to the viscous shear apparatus.

Referring still to FIG. 12, in Step 1226, any char, dirt, debris or other non-hydrocarbon material remaining in the ribbonchannel reactor may be removed, as has been described in more detail above. The removal may include a cooling step, to avoid the risk of combustion of the very hot solids, as described above.

Finally, as shown in FIG. 12, in Step 1228, in one embodiment, the energy obtained from combustion of the non-condensable gas in the Step 1222 may be provided to the process as heat directly to the ribbonchannel reactor and/or the electricity generated from the combustion in the Step 1222 may be used in any or all portions of the process to operate pumps, controls, heating elements, lighting, etc. In one embodiment, sufficient non-condensable gas is produced by the process to provide all of the electrical requirements of the entire process, including to operate pumps, controls, heating elements, lighting, etc.

FIG. 12 is intended to provide a general, non-limiting overview of various embodiments of the present invention. The present invention is more fully described in the specification as a whole and in the claims appended hereto.

As will be understood based on the disclosure herein, the process of converting the feed composition into useable hydrocarbon materials may include one or more of vaporization, thermal decomposition, polymer chain scission, pyrolysis, depolymerization, and cracking. The actual reactions taking place in the thermal decomposition assembly are not known exactly, but are believed to include one or more of the foregoing. Other or faster reactions may take place as well, if the operator of the apparatus should add, e.g., a catalyst to the plastic material fed to the system.

In one embodiment of the present invention, no catalyst is needed and none is used. It is recognized that if no catalyst is used, there is no problem of removing the spent catalyst from the system and/or from the hydrocarbon product. In one embodiment, no additives are combined with the feed composition prior to its entry to the viscous shear apparatus. In the prior art various materials have been added, with the purpose to cause the decomposition to proceed at lower temperature, etc. In one embodiment, no decomposition catalyst is added. In one embodiment, no free radical generator, which in the prior art has been attempted for increasing the productivity, is added. In one embodiment, no hydrogen is added. In one embodiment, no hydrogenation/dehydrogenation catalyst is added. In one embodiment, no additives such as molten salt, molten metal, sand or other relatively inert solids are added to the feed material. Such materials have been added in the prior art in yet another effort to overcome the problems of poor heat transfer which is inherent in polymeric materials. The present invention provides a solution to this problem by its use of the ribbonchannel reactor, in which relatively thin ribbons of material are effectively, quickly and efficiently heated to decomposition, and in some embodiments, such additives are not needed or used.

In accordance with one embodiment of the present invention, substantially all of the decomposition and vaporization takes place in the ribbonchannel reactor. Thus, in one embodiment, there is substantially no volatilization of hydrocarbon materials in the viscous shear apparatus. Of course, in the viscous shear apparatus, there may be volatilization of materials such as water which may be present. In one embodiment, there is no char formed in the viscous shear apparatus.

In one embodiment, the apparatus and process of the present invention do not require high pressure. In one embodiment, the process does not include the use of a catalyst to induce decomposition of the feed composition. In one embodiment, no special gases, such as hydrogen, are added, to reduce unsaturation in the polymer material or its breakdown products. In one embodiment, the only source of heat is the heat applied to the heated hollow cylinders. In the present invention, the process is operated on a single pass-through of the feed composition, so that there is no recirculation into the process of either the feed composition or its decomposition products. In one embodiment, any materials present as additives in the feed composition, such as plasticizers, pigments or other additives used in plastics, are not separated or separately recovered. Such materials decompose into one or more of the products—hydrocarbon material, char, or non-condensable gas. In one embodiment, there is no need for water washing of the hydrocarbon product, and there is no such washing included.

Although the invention has been shown and described with respect to certain embodiments, equivalent alterations and modifications will occur to others skilled in the art upon reading and understanding this specification and the annexed drawings. In particular regard to the various functions performed by the above described integers (components, assemblies, devices, compositions, steps, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as maybe desired and advantageous for any given or particular application.

The invention claimed is:

1. A process for converting a feed composition to a hydrocarbon material in a ribbonchannel reactor, wherein the reactor comprises a first heated cylindrical surface and a second heated cylindrical surface spaced away from and mounted concentrically within the first heated cylindrical surface, and wherein the feed composition comprises one or more materials decomposable into the hydrocarbon material, the process comprising softening the feed composition in a viscous shear apparatus;

flowing the softened feed composition in the reactor;

rotating the first heated surface relative to the second heated surface;

forming between the first heated surface and the second heated surface a substantially spiral ribbon comprising the feed composition; and heating the substantially spiral ribbon to generate a vapor comprising the hydrocarbon material.

2. The process of claim 1 wherein the ribbonchannel reactor further comprises a plurality of low flighting mounted on the first heated surface, wherein the first heated surface, the second heated surface and the low flighting define a substantially spiral ribbonchannel, and wherein the flowing form in the ribbonchannel a substantially spiral ribbon comprising the feed material.

3. The process of claim 1 further comprising removing and condensing at least a portion of the vapor.

4. The process of claim 1 wherein the viscous shear apparatus heats the feed composition to a temperature in the range from about 460° F. (236° C.) to about 600° F. (316° C.) and wherein the heating further heats the feed composition to a temperature from about 694° to about 1000° F.

5. The process of claim 1 wherein substantially all of the softening results from heat generated by mechanical shear and substantially no decomposition of the feed composition occurs during the softening.

6. The process of claim 1 wherein the viscous shear apparatus comprises an extruder.

7. The process of claim 1 wherein the providing further comprises one or more of compacting the feed composition when provided in a low bulk density form to reduce content of air and/or moisture; maintaining the feed composition in a reduced oxygen atmosphere; removing moisture from the feed composition; removing one or more non-polymeric contaminant from the feed composition; removing air from the feed composition and comminuting the feed composition.

8. The process of claim 1 further comprising adding a catalyst to the feed composition at one or more of the flowing, forming, rotating and heating.

9. The process of claim 8 wherein the catalyst comprises fly ash.

10. An apparatus for producing hydrocarbon materials from a feed composition, comprising:
   a feed port;
   a viscous shear apparatus;
   a thermal decomposition assembly comprising
      a ribbonchannel reactor, the ribbonchannel reactor comprising:
      (a) an inner heated hollow cylinder; and
      (b) an outer heated hollow cylinder, wherein the inner heated cylinder is mounted substantially concentric within and rotatable with respect to the outer heated hollow cylinder, and wherein both heated hollow cylinders provide heat for increasing temperature of the feed composition to convert the feed composition into (i) a vapor fraction and (ii) a solid residue fraction;
      (c) low height flighting mounted with respect to the inner heated hollow cylinder and the outer heated hollow cylinder adapted to move the feed composition towards a distal portion of the thermal decomposition assembly;
      (d) at least one vapor port for removing the vapor fraction; and
      (e) at least one solids port at the distal portion of the thermal decomposition assembly for removing the solid fraction.

11. The apparatus of claim 10 further comprising means for collecting and for condensing at least a portion of the vapor fraction.

12. The apparatus of claim 11 wherein the means for condensing include a condenser operated at a temperature in the range from about 130° F. to about 180° F. (about 54° C. to about 82° C.).

13. The apparatus of claim 10 wherein the ribbonchannel reactor comprises a single heating zone and temperature of the feed composition increases to a temperature in the range from about 694° to about 1000° F. as the feed composition passes through the ribbonchannel reactor from the proximal portion to the distal portion.

14. The apparatus of claim 10 wherein the ribbonchannel reactor comprises at least two zones of sequentially increasing temperature and temperature of the feed composition increases to a temperature in the range from about 694° to about 1000° F. as the feed composition passes through the ribbonchannel reactor from the proximal portion to the distal portion.

15. The apparatus of claim 10 wherein the viscous shear apparatus heats the feed composition to a temperature in the range from about 460° F. (236° C.) to about 600° F. (316° C.).

16. The apparatus of claim 10 wherein the viscous shear apparatus comprises a single screw extruder.

17. The apparatus of claim 10 wherein the viscous shear apparatus is adapted for softening but not decomposing a feed composition fed from the feed port and substantially all of the softening results from heat generated by mechanical shear in the viscous shear apparatus.

18. The apparatus of claim 10 wherein the inner heated hollow cylinder has an outer radius, the outer heated hollow cylinder has an inner radius, and a ratio of the outer radius to the inner radius is in a range from about 0.85 to about 0.98 and wherein the low height flighting is disposed between the inner heated hollow cylinder and the outer heated hollow cylinder.

19. The apparatus of claim 10 wherein the inner heated hollow cylinder has an outer radius, the outer heated hollow cylinder has an inner radius, and the outer radius and the inner radius differ in the range from about 0.25 inch to about 1.5 inch (about 0.63 cm. to about 3.8 cm.), when the outer diameter is in the range from about 12 inches to about 36 inches (about 30.5 cm. to about 91.5 cm.) and wherein the low height flighting is disposed between the inner heated hollow cylinder and the outer heated hollow cylinder.

20. The apparatus of claim 10 wherein the low height flighting comprises a plurality of spirally oriented flights extending outwardly from an outer surface of the inner heated hollow cylinder and the flights have a substantially constant pitch in the range from about 4 in. to about 10 in.

21. The apparatus of claim 10 wherein the low height flighting comprises a plurality of spirally oriented flights extending outwardly from an outer surface of the inner heated hollow cylinder and the flights have a pitch in the range from about 10 in. to about 2 in. and the pitch decreases, within the range, from the proximal portion to the distal portion of the ribbonchannel reactor.

22. The apparatus of claim 10 wherein the ribbonchannel reactor comprises electrical resistance heating elements.

23. The apparatus of claim 10 wherein the low flighting has an operational clearance from the outer heated hollow cylinder in the range of about 0.01 inch to about 0.025 inch.

24. A ribbonchannel reactor comprising:
   (a) an inner heated hollow cylinder; and
   (b) an outer heated hollow cylinder, wherein the inner heated cylinder is mounted substantially concentric within and rotatable with respect to the outer heated hollow cylinder, and wherein both heated hollow cylinders provide externally-applied heat for increasing temperature of a feed composition to convert the feed composition into (i) a vapor fraction and (ii) a solid residue fraction;
   (c) low height flighting mounted with respect to the inner heated hollow cylinder and the outer heated hollow cylinder adapted to move the feed composition towards a distal portion of the thermal decomposition assembly;
   (d) at least one vapor port for removing the vapor fraction; and
   (e) at least one solids port at the distal portion of the thermal decomposition assembly for removing the solid fraction.

25. The ribbonchannel reactor of claim 24 further comprising a manifold for collecting the vapor fraction and a condenser for condensing at least a portion of the vapor fraction.

26. The ribbonchannel reactor of claim 24 wherein the externally-applied heat is from heat sources adapted to heat the feed composition to a temperature in the range from about 694° to about 1000° F.

* * * * *